United States Patent
Wu et al.

(10) Patent No.: US 11,617,143 B2
(45) Date of Patent: Mar. 28, 2023

(54) SIDELINK BROADCAST CHANNEL TRANSMISSION

(71) Applicant: QUALCOMM Incorporated, San Diego, CA (US)

(72) Inventors: Shuanshuan Wu, San Diego, CA (US); Kapil Gulati, Belle Mead, NJ (US); Gabi Sarkis, San Diego, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 17/088,377

(22) Filed: Nov. 3, 2020

(65) Prior Publication Data

US 2021/0144659 A1 May 13, 2021

Related U.S. Application Data

(60) Provisional application No. 62/933,284, filed on Nov. 8, 2019.

(51) Int. Cl.
*H04W 56/00* (2009.01)
*H04W 72/00* (2009.01)
(Continued)

(52) U.S. Cl.
CPC ....... *H04W 56/001* (2013.01); *H04J 13/0029* (2013.01); *H04L 5/005* (2013.01);
(Continued)

(58) Field of Classification Search
CPC ............ H04J 13/0029; H04W 56/001; H04W 56/002; H04W 88/04; H04W 72/005;
(Continued)

(56) References Cited

U.S. PATENT DOCUMENTS

| | | | |
|---|---|---|---|
| 2015/0326362 A1* | 11/2015 | Xiong | H04W 76/10 370/336 |
| 2017/0142741 A1* | 5/2017 | Kaur | H04W 76/19 |

(Continued)

FOREIGN PATENT DOCUMENTS

WO  WO-2016105136 A1  6/2016

OTHER PUBLICATIONS

Intel Corporation: "On PSBCH Physical Layer Design for V2V Communication", 3GPP Draft, 3GPP TSG RAN WG1 Meeting #8 6bis, R1-1609461 Intel—PSBCH, 3rd Generation Partnership Project (3GPP), Mobile Competence Centre, 650, Route Des Lucioles, F-06921 Sophia-Antipolis Cedex, France, vol. RAN WG1. No. Lisbon, Portugal, Oct. 10, 2016-Oct. 14, 2016 Oct. 1, 2016 (Oct. 1, 2016), XP051159532, pp. 1-4, Retrieved from the Internet: URL:http://www.3gpp.org/ftp/tsg_ran/WG1_RL1/TSGR1_86b/Docs/ [retrieved on Oct. 1, 2016] section 3, figure 1.

(Continued)

*Primary Examiner* — Derrick V Rose
(74) *Attorney, Agent, or Firm* — Danai Nelisile Mhembere; Holland & Hart LLP

(57) ABSTRACT

Methods, systems, and devices for wireless communications are described. A user equipment (UE) may receive a sidelink synchronization signal and may identify a set of parameters (e.g., cyclic shifts or orthogonal cover codes) that are configured for generating a set of reference signals for transmission within a sidelink broadcast resource based on receiving the sidelink synchronization signal. The UE may transmit, within the sidelink broadcast channel resource, a first reference signal of the set of reference signals that is generated based on applying, to a reference signal sequence, a first parameter of the set of parameters that is orthogonal to a second parameter of the set of parameters that is applied (Continued)

to the reference signal sequence to generate a second reference signal of the set of reference signals.

53 Claims, 14 Drawing Sheets

(51) Int. Cl.
    *H04L 5/00*     (2006.01)
    *H04L 27/26*     (2006.01)
    *H04J 13/00*     (2011.01)
    *H04W 92/18*     (2009.01)

(52) U.S. Cl.
    CPC ....... *H04L 27/2607* (2013.01); *H04W 72/005* (2013.01); *H04W 92/18* (2013.01)

(58) Field of Classification Search
    CPC ............. H04W 92/18; H04L 27/26025; H04L 27/2607; H04L 27/2613; H04L 5/0048; H04L 5/005; H04L 5/0051; H04L 63/168; H04L 63/1433
    See application file for complete search history.

(56) References Cited

U.S. PATENT DOCUMENTS

| | | |
|---|---|---|
| 2018/0287866 A1 | 10/2018 | Yoon |
| 2019/0116567 A1* | 4/2019 | Zhang ................. H04L 27/2607 |
| 2020/0092876 A1* | 3/2020 | Cho ....................... H04L 5/0048 |
| 2021/0392592 A1* | 12/2021 | Ko ......................... H04L 5/0048 |

OTHER PUBLICATIONS

International Search Report and Written Opinion—PCT/US2020/058977—ISA/EPO—dated Feb. 11, 2021.
Spreadtrum Communications: "Discussion on Synchronization Mechanism for NR V2X", 3GPP Draft, 3GPP TSG RAN WG1 Meeting #97, R1-1906364, Discussion on Synchronization Mechanism for NR V2X, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051727814, 10 pages, 10 pages, Retrieved from the Internet: URL: http://www.3gpp.org/ftp/Meetings%5F3GPP%5FSYNC/RAN1/Docs/R1%2D1906364%2Ezip [retrieved on May 13, 2019] Paragraph "2.4 SL-MIB contents", p. 2. last paragraph p. 6, lines 7-10.

* cited by examiner

SIDELINK BROADCAST CHANNEL TRANSMISSION

CROSS REFERENCE

The present application for patent claims the benefit of U.S. Provisional Patent Application No. 62/933,284 by WU et al., entitled "SIDELINK BROADCAST CHANNEL TRANSMISSION," filed Nov. 8, 2019, assigned to the assignee hereof, and expressly incorporated by reference herein.

FIELD OF TECHNOLOGY

The following relates generally to wireless communications and more specifically to sidelink broadcast channel transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, UEs may communicate with each other, which may be referred to as sidelink communications. For instance, a first UE may transmit a physical sidelink broadcast channel (PSBCH) transmission to a second UE. The PSBCH transmission may provide configuration information to the second UE, which the second UE may use in performing communications.

SUMMARY

The described techniques relate to improved methods, systems, devices, and apparatuses that support sidelink broadcast channel transmissions. Generally, the described techniques provide for a first user equipment (UE) to identify a set of parameters that are configured for generating a set of reference signals for transmission within a sidelink broadcast resource based on a received sidelink synchronization signal. The first UE may transmit a first reference signal of the set of reference signals (e.g., a demodulation reference signal (DMRS)) and a first sidelink broadcast channel transmission in the sidelink broadcast channel resource. Likewise, a second UE may transmit a second reference signal of the set of reference signals (e.g., another DMRS) and a second sidelink broadcast channel transmission in the sidelink broadcast channel resource. In some cases, the first reference signal may be generated based on applying a first parameter of the set of parameters to a reference signal sequence and the second reference signal may be generated based on applying a second parameter of the set of parameters to the reference signal sequence.

To enable a third UE to receive and decode both transmissions, the first and second reference signals may be orthogonal to each other such that the third UE may receive multiple orthogonal reference signals. The third UE, upon receiving the first and second orthogonal reference signals, may demodulate the first sidelink broadcast channel transmission and/or the second sidelink broadcast transmission. Upon demodulating the first sidelink broadcast channel transmission and/or the second sidelink broadcast transmission, the third UE may decode the first sidelink broadcast channel transmission and/or the second sidelink broadcast transmission.

A method for wireless communications by a UE is described. The method may include receiving a sidelink synchronization signal, identifying a set of parameters that are configured for generating a set of reference signals for transmission within a sidelink broadcast channel resource based on receiving the sidelink synchronization signal, and transmitting, within the sidelink broadcast channel resource, a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals.

An apparatus for wireless communications by a UE is described. The apparatus may include a processor, memory in electronic communication with the processor, and instructions stored in the memory. The instructions may be executable by the processor to cause the apparatus to receive a sidelink synchronization signal, identify a set of parameters that are configured for generating a set of reference signals for transmission within a sidelink broadcast channel resource based on receiving the sidelink synchronization signal, and transmit, within the sidelink broadcast channel resource, a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals.

Another apparatus for wireless communications by a UE is described. The apparatus may include means for receiving a sidelink synchronization signal, means for identifying a set of parameters that are configured for generating a set of reference signals for transmission within a sidelink broadcast channel resource based on receiving the sidelink synchronization signal, and means for transmitting, within the sidelink broadcast channel resource, a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals.

A non-transitory computer-readable medium storing code for wireless communications by a UE is described. The code may include instructions executable by a processor to receive a sidelink synchronization signal, identify a set of parameters that are configured for generating a set of reference signals for transmission within a sidelink broadcast channel resource based on receiving the sidelink synchronization signal, and transmit, within the sidelink broadcast channel resource, a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals.

In some examples of the method, apparatuses, and non-transitory computer-readable medium described herein, receiving the sidelink synchronization signal may include operations, features, means, or instructions for receiving the sidelink synchronization signal that indicates an identifier of the sidelink synchronization signal, where the set of parameters may be identified based on the identifier of the sidelink synchronization signal.

In some examples of the method, apparatuses, and non-transitory computer-readable medium described herein, receiving the sidelink synchronization signal may include operations, features, means, or instructions for receiving the sidelink synchronization signal that indicates a number of hops between the UE and a synchronization source for the sidelink synchronization signal, where the set of parameters may be identified based on the number of hops.

Some examples of the method, apparatuses, and non-transitory computer-readable medium described herein may further include operations, features, means, or instructions for transmitting, within the sidelink broadcast channel resource, a first sidelink broadcast transmission that corresponds to the first reference signal.

In some examples of the method, apparatuses, and non-transitory computer-readable medium described herein, transmitting the first reference signal may include operations, features, means, or instructions for transmitting the first reference signal within a set of subcarriers of the sidelink broadcast channel resource that may be uniformly spaced in frequency.

In some examples of the method, apparatuses, and non-transitory computer-readable medium described herein, each of the set of subcarriers may have at least one intervening subcarrier therebetween.

In some examples of the method, apparatuses, and non-transitory computer-readable medium described herein, transmitting the first reference signal may include operations, features, means, or instructions for transmitting the first reference signal within a set of symbol periods of the sidelink broadcast channel resource that may be uniformly spaced in time.

In some examples of the method, apparatuses, and non-transitory computer-readable medium described herein, each of the set of symbol periods may have at least one intervening symbol period therebetween.

Some examples of the method, apparatuses, and non-transitory computer-readable medium described herein may further include operations, features, means, or instructions for determining to apply the first parameter based at least on a function of a number of hops between the UE and a synchronization source for the sidelink synchronization signal.

In some examples of the method, apparatuses, and non-transitory computer-readable medium described herein, the function may be a modulo function.

Some examples of the method, apparatuses, and non-transitory computer-readable medium described herein may further include operations, features, means, or instructions for determining to apply the first parameter based at least on a function of an identifier indicated in the sidelink synchronization signal.

In some examples of the method, apparatuses, and non-transitory computer-readable medium described herein, the function may be a modulo function.

Some examples of the method, apparatuses, and non-transitory computer-readable medium described herein may further include operations, features, means, or instructions for generating a reference signal symbol based on the reference signal sequence, and generating the first reference signal based on applying the first parameter to the reference signal symbol.

In some examples of the method, apparatuses, and non-transitory computer-readable medium described herein, the first parameter may be a first cyclic shift of the reference signal symbol that differs from the second parameter that may be a second cyclic shift of the reference signal symbol.

In some examples of the method, apparatuses, and non-transitory computer-readable medium described herein, the reference signal sequence may be a demodulation reference signal sequence and the set of reference signals may be a set of demodulation reference signals.

In some examples of the method, apparatuses, and non-transitory computer-readable medium described herein, the set of parameters may be a set of orthogonal cover codes.

In some examples of the method, apparatuses, and non-transitory computer-readable medium described herein, the reference signal sequence may be a Gold sequence.

In some examples of the method, apparatuses, and non-transitory computer-readable medium described herein, the sidelink broadcast channel resource may be a resource within a transmission time interval.

Some examples of the method, apparatuses, and non-transitory computer-readable medium described herein may further include operations, features, means, or instructions for generating the reference signal sequence based on initializing a pseudo random sequence generator with an initialization value.

A method for wireless communications by a UE is described. The method may include receiving a sidelink synchronization signal, identifying a set of parameters that are configured for generating a set of reference signals for transmission within a sidelink broadcast channel resource based on receiving the sidelink synchronization signal, and monitoring, within the sidelink broadcast channel resource, for a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals.

An apparatus for wireless communications by a UE is described. The apparatus may include a processor, memory in electronic communication with the processor, and instructions stored in the memory. The instructions may be executable by the processor to cause the apparatus to receive a sidelink synchronization signal, identify a set of parameters that are configured for generating a set of reference signals for transmission within a sidelink broadcast channel resource based on receiving the sidelink synchronization signal, and monitor, within the sidelink broadcast channel resource, for a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals.

Another apparatus for wireless communications by a UE is described. The apparatus may include means for receiving a sidelink synchronization signal, means for identifying a set of parameters that are configured for generating a set of reference signals for transmission within a sidelink broadcast channel resource based on receiving the sidelink synchronization signal, and means for monitoring, within the sidelink broadcast channel resource, for a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals.

A non-transitory computer-readable medium storing code for wireless communications by a UE is described. The code may include instructions executable by a processor to receive a sidelink synchronization signal, identify a set of parameters that are configured for generating a set of reference signals for transmission within a sidelink broadcast channel resource based on receiving the sidelink synchronization signal, and monitor, within the sidelink broadcast channel resource, for a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals.

Some examples of the method, apparatuses, and non-transitory computer-readable medium described herein may further include operations, features, means, or instructions for monitoring, within the sidelink broadcast channel resource, for the second reference signal.

Some examples of the method, apparatuses, and non-transitory computer-readable medium described herein may further include operations, features, means, or instructions for receiving, within the sidelink broadcast channel resource, the first reference signal based on the first parameter and the second reference signal based on the second parameter, demodulating the sidelink broadcast channel resource based on the first reference signal to receive a first sidelink broadcast channel transmission, and demodulating the sidelink broadcast channel resource based on the second reference signal to receive a second sidelink broadcast channel transmission.

In some examples of the method, apparatuses, and non-transitory computer-readable medium described herein, receiving the sidelink synchronization signal may include operations, features, means, or instructions for receiving the sidelink synchronization signal that indicates an identifier of the sidelink synchronization signal, where the set of parameters may be identified based on the identifier of the sidelink synchronization signal.

In some examples of the method, apparatuses, and non-transitory computer-readable medium described herein, receiving the sidelink synchronization signal may include operations, features, means, or instructions for receiving the sidelink synchronization signal that indicates a number of hops between the UE and a synchronization source for the sidelink synchronization signal, where the set of parameters may be identified based on the number of hops.

In some examples of the method, apparatuses, and non-transitory computer-readable medium described herein, monitoring for the first reference signal may include operations, features, means, or instructions for monitoring for the first reference signal within a set of subcarriers of the sidelink broadcast channel resource that may be uniformly spaced in frequency.

In some examples of the method, apparatuses, and non-transitory computer-readable medium described herein, each of the set of subcarriers may have at least one intervening subcarrier therebetween.

In some examples of the method, apparatuses, and non-transitory computer-readable medium described herein, monitoring for the first reference signal may include operations, features, means, or instructions for monitoring for the first reference signal within a set of symbol periods of the sidelink broadcast channel resource that may be uniformly spaced in time.

In some examples of the method, apparatuses, and non-transitory computer-readable medium described herein, each of the set of symbol periods may have at least one intervening symbol period therebetween.

In some examples of the method, apparatuses, and non-transitory computer-readable medium described herein, the reference signal sequence may be a demodulation reference signal sequence and the set of reference signals may be a set of demodulation reference signals.

In some examples of the method, apparatuses, and non-transitory computer-readable medium described herein, the set of parameters may be a set of orthogonal cover codes.

In some examples of the method, apparatuses, and non-transitory computer-readable medium described herein, the reference signal sequence may be a Gold sequence.

In some examples of the method, apparatuses, and non-transitory computer-readable medium described herein, the sidelink broadcast channel resource may be a resource within a transmission time interval.

Some examples of the method, apparatuses, and non-transitory computer-readable medium described herein may further include operations, features, means, or instructions for generating the reference signal sequence based on initializing a pseudo random sequence generator with an initialization value.

DETAILED DESCRIPTION

A user equipment (UE) may perform sidelink communications with another UE. Such communications may include vehicle to everything (V2X) or device to device (D2D) communications. V2X systems may involve UEs attached to vehicles communicating with each other and D2D systems may involve UEs that communicate with each other without first communicating with a base station. One example of performing sidelink communications may involve a UE transmitting or receiving a physical sidelink broadcast channel (PSBCH) transmission. The PSBCH transmission may propagate configurations (e.g., a frame number) to a UE via sidelink. One or more of the UEs performing sidelink communications may not have a direct connection with a timing source and may rely on receiving a synchronization signal from other UEs for maintaining synchronization.

In some cases, a first user equipment (UE) that has been synchronized with at least one other UE or a synchronization source may transmit a first PSBCH transmission and a second UE that has been synchronized with at least one other UE or a synchronization source may transmit a second PSBCH transmission to a third UE on a shared sidelink broadcast channel resource. If both PSBCH transmissions have the same content (e.g., a same payload) and/or demodulation reference signal (DMRS), the third UE may be able decode the PSBCH transmissions. However, if the PSBCH transmissions have a different content or the same content but different DMRSs, the UE may be unable to decode one or both of the PSBCH transmissions.

To enable the third UE to decode one or both of the PSBCH transmissions, the first UE and the second UE may transmit PSBCH transmissions that are orthogonal to each other. Orthogonal PSBCH transmissions may be transmissions whose DMRSs are orthogonal. For instance, a DMRS sequence associated with each transmission may be generated from the same initialization value or seed but with different cyclic shifts or orthogonal cover codes (OCC) applied to the corresponding DMRS symbols of the DMRS sequence. By ensuring that the PSBCH transmissions are orthogonal via the methods described herein, the third UE may be able to decode the one or both of the PSBCH transmissions, even if the PSBCH transmissions have different content.

Aspects of the disclosure are initially described in the context of wireless communications systems. Additional aspects of the disclosure are described in the context of an additional wireless communications system, a communications scheme, and broadcast resource diagrams. Aspects of the disclosure are further illustrated by and described with reference to apparatus diagrams, system diagrams, and flowcharts that relate to sidelink broadcast channel transmission.

Figure 1:
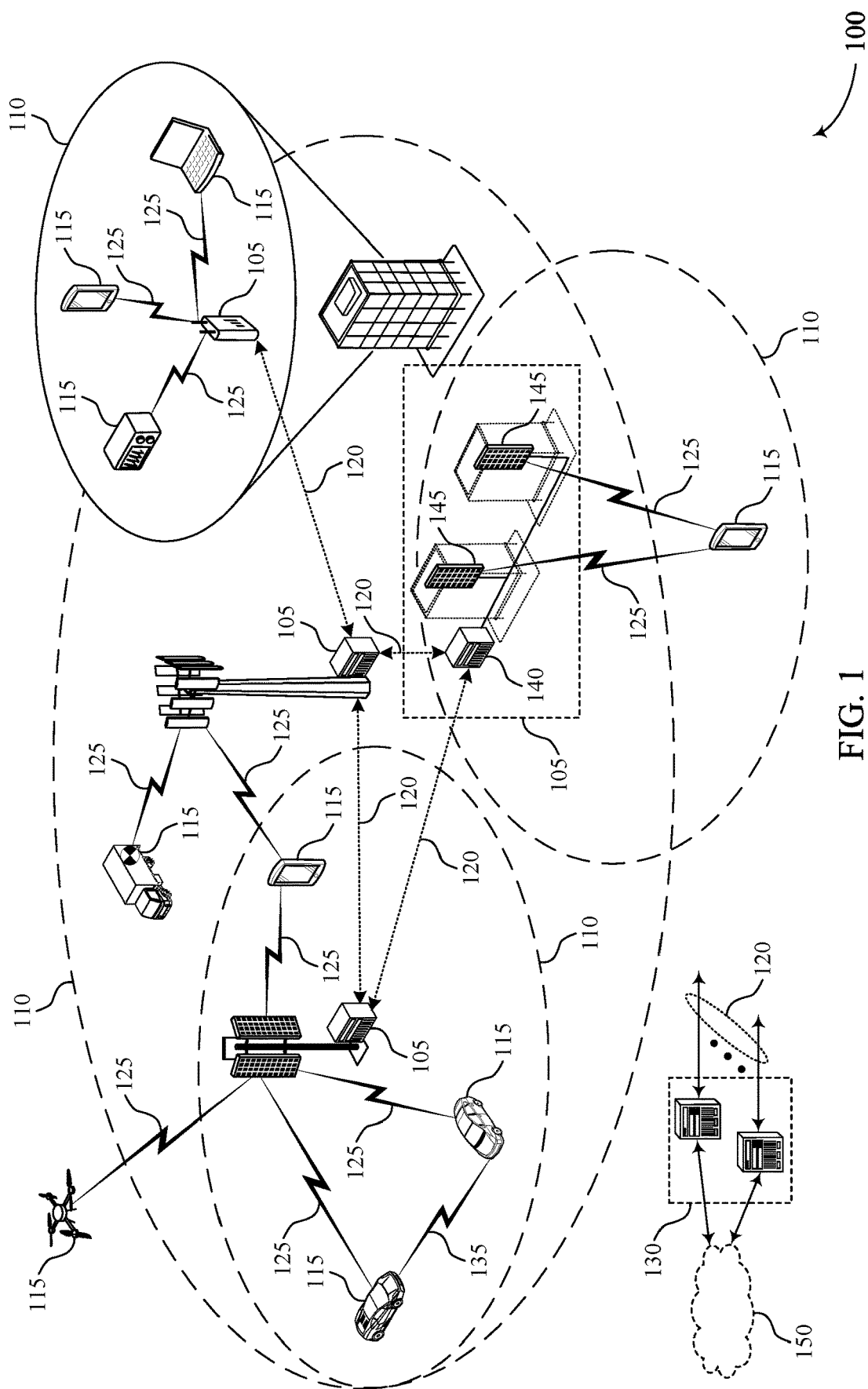
FIG. 1 illustrates an example of a system for wireless communications in accordance with aspects of the present disclosure.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element (RE) may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels.

In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

The methods herein may describe a physical broadcast channel transmission on sidelink. In some cases, a first UE 115 may receive a sidelink synchronization signal and may identify a set of parameters (e.g., a plurality of parameters including at least a first parameter and a second parameter) that are configured for generating a set of reference signals for transmission within a sidelink broadcast resource based on receiving the sidelink synchronization signal. The first UE 115 may transmit a first reference signal of the set of reference signals (e.g., a DMRS) and/or a first sidelink broadcast channel transmission in the sidelink broadcast channel resource. Likewise, a second UE 115 may transmit a second reference signal of the set of reference signals (e.g., another DMRS) and/or a second sidelink broadcast channel transmission in the sidelink broadcast channel resource. In some cases, the first reference signal may be generated based on applying a first parameter of the set of parameters to a reference signal sequence and the second reference signal may be generated based on applying a second parameter of the set of parameters to the reference signal sequence.

To enable a third UE 115 to receive and decode both transmissions, the first and second reference signals may be orthogonal to each other. The third UE 115, upon receiving the first and second orthogonal reference signals, may demodulate the first sidelink broadcast channel transmission and/or the second sidelink broadcast transmission. Upon demodulating the first sidelink broadcast channel transmission and/or the second sidelink broadcast transmission, the third UE may decode the first sidelink broadcast channel transmission and/or the second sidelink broadcast transmission.

Figure 2:
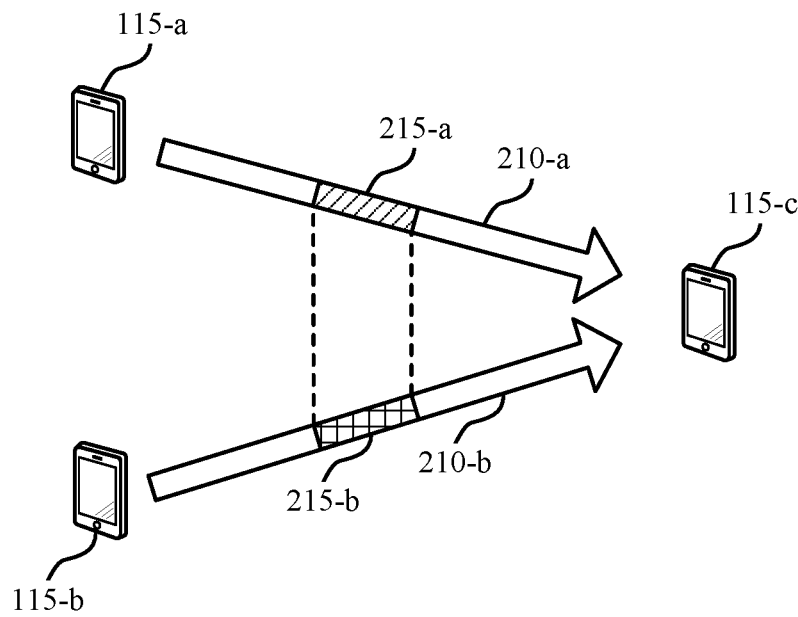
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may be implemented by aspects of wireless communications system 100. For instance, wireless communications system 200 may be implemented by UEs 115-*a*, 115-*b*, and 115-*c*, which may be examples of UEs 115 as described with reference to FIG. 1. UE 115-*a* may communicate with UE 115-*c* via sidelink 210-*a* and UE 115-*b* may communicate with UE 115-*c* via sidelink 210-*b*.

In some cases, multiple UEs 115 (e.g., UEs 115-*a* and 115-*b*) may transmit a same PSBCH transmission 215 on a same sidelink broadcast channel resource. UEs 115 may do so if they are synchronized to a same synchronization source (e.g., a global navigation satellite system (GNSS) or a base station 105) and have a same hop counter. In such cases, the PSBCH transmissions 215 may be a combination of a same signal (e.g., not interference) that is transmitted by different UEs 115 (e.g., UEs 115-*a*, 115-*b*) within the same sidelink broadcast channel resource. A UE 115-*c* may receive the combined signal within the same sidelink broadcast channel resource and decode the PSBCH transmission 215 from the combined signal.

In another example, multiple UEs 115 may transmit different PSBCH transmissions 215 on the same sidelink broadcast channel resource. For instance, UE 115-*a* may transmit PSBCH transmission 215-*a* on a same sidelink broadcast channel resource as that which UE 115-*b* transmits PSBCH transmission 215-*b*, where PSBCH transmission 215-*a* may be different from PSBCH transmission 215-*b*. PSBCH transmissions 215 may be considered different if at least the content (e.g., the payload) of each PSBCH transmission 215 is different (e.g., if one or more parameters in each PSBCH transmission 215 have different values). UEs 115 may transmit different PSBCH transmissions 215 over a same sidelink broadcast channel resource if the UEs 115 have different synchronization sources or if they have the same synchronization source but with different hop counters. Using the techniques described herein, UEs 115-*a* and 115-*b* may transmit orthogonal DMRSs corresponding to the different PSBCH transmissions 215 on the same sidelink broadcast channel resource, thereby enabling the receiver UE 115-*c* to demodulate and decode each or one of the different PSBCH transmissions 215 from the same sidelink broadcast channel resource.

In some cases, PSBCH transmissions 215 may include one or more REs for a DMRS. The DMRS may assist UE 115-*c* in decoding the corresponding PSBCH transmission 215. When UE 115-*c* receives two PSBCH transmissions 215-*a* and 215-*b* on the same sidelink broadcast channel resource, the DMRSs for each PSBCH transmission 215 may be considered orthogonal to each other if the DMRS sequences are the same (e.g., from the same pseudo-noise (PN) sequence generator with the same initialization value) and if different parameters of a set of parameters (e.g., cyclic shifts of a set of cyclic shifts or cover codes of a set of cover codes) are applied to the corresponding DMRS symbols of the DMRS sequence. In such cases, the PSBCH transmissions 215 may be said to be orthogonal. A UE 115 transmitting the PSBCH transmission 215 may determine a PSBCH DMRS RE location, a PN sequence initialization value (e.g., a seed) for DMRS symbol generation, and a cyclic shift or cover code to be applied to the DMRS symbols. More details about how a UE 115 sets up PSBCH transmissions 215 may be described with reference to FIG. 3.

If the different PSBCH transmissions 215-a and 215-b are not orthogonal but the corresponding DMRSs have the same frequency location (e.g., are on the same REs), the interference between the different PSBCH transmissions 215-a and 215-b may prevent UE 115-c from decoding the PSBCH transmissions 215-a and 215-b (e.g., the transmissions may be undecodable). However, as described herein, if the different PSBCH transmissions 215-a and 215-b are orthogonal and the DMRSs have the same frequency location, UE 115-c may be able to decode one or multiple of the PSBCH transmissions 215-a and 215-b. More details about the form of the orthogonal DMRS REs may be described with reference to FIGS. 4A and 4B. In some cases, a PSBCH transmission 215 may be transmitted when sidelink is deployed in an unlicensed or intelligent transportation system (ITS) spectrum, in which case UEs 115-c may not receive a physical broadcast channel (PBCH) transmission from a base station 105.

Performing the methods as described herein may enable UE 115-c to demodulate multiple different PSBCHs on a same sidelink broadcast channel resource. Other methods UE 115-c may perform may fail to demodulate either of the PSBCHs due to interference or may at least fail to demodulate both of them. By being capable of demodulating one or both of the PSBCHs, UE 115-c may acquire access to a greater amount of information and may be able to perform communications more efficiently according to the greater amount of information to which UE 115-c has access.

Figure 3:
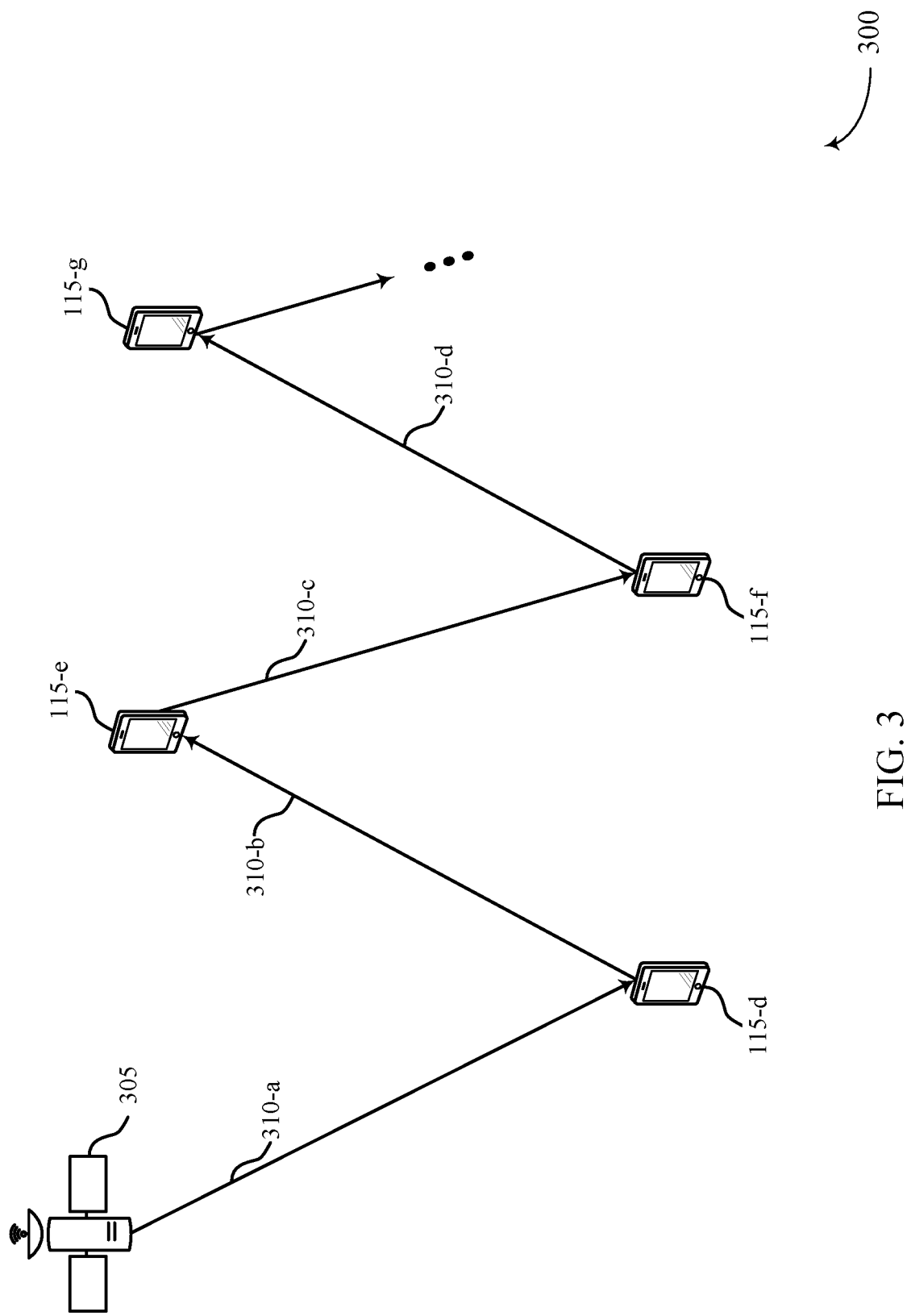
FIG. 3 illustrates an example of a communications scheme in accordance with aspects of the present disclosure.

FIG. 3 illustrates an example of a communications scheme 300 in accordance with aspects of the present disclosure. In some examples, communications scheme 300 may be implemented by aspects of wireless communications system 100. For instance, communications scheme 300 may be implemented by UEs 115-d, 115-e, 115-f, and 115-g which may be examples of UEs 115 as described with reference to FIG. 1.

Initially, synchronization device 305 may transmit a synchronization signal 310-a to UE 115-d as part of a first hop (i.e., hop 0). UE 115-d may transmit a corresponding synchronization signal 310-b to UE 115-e as part of a second hop (i.e., hop 1). UE 115-e may transmit a corresponding synchronization signal 310-c to UE 115-f as part of a third hop (i.e., hop 2). UE 115-f may transmit a corresponding synchronization signal 310-d to UE 115-g as part of a fourth hop (i.e., hop 3). Synchronization signal 310-a may be a global navigation satellite system (GNSS) synchronization signal or may be a synchronization signal from a base station 105.

When a UE 115 receives a synchronization signal 310, the UE 115 may determine a sidelink synchronization signal (SLSS) identifier (ID) of the source. For instance, when UE 115-d receives synchronization signal 310-a, UE 115-d may select an SLSS ID (e.g., 0) or the synchronization signal 310 may indicate the SLSS ID. In this example, synchronization device 305 may be the synchronization source for UE 115-d. UE 115-e, upon receiving synchronization signal 310-b, may identify that the source SLSS ID of UE 115-d is 0 and may determine that its source SLSS ID is 0 as well. This process may continue for each UE 115 that receives a synchronization signal 310 from another UE 115. Additionally or alternatively, one of the UEs (e.g., UE 115-f) may have an SLSS ID different from the SLSS ID of the UE 115 that transmitted the synchronization signal to the one of the UEs 115 (e.g., UE 115-e).

Additionally, each UE 115 may determine to use a particular resource for transmitting a PSBCH transmission. For instance, UE 115-d may transmit a PSBCH transmission with a first payload (i.e., PSBCH1) over a first sidelink broadcast channel resource (i.e., resource1). UE 115-e may transmit a PSBCH transmission with a second payload (i.e., PSBCH2) over a second sidelink broadcast channel resource (i.e., resource2). UE 115-f may transmit a PSBCH transmission with a third payload (i.e., PSBCH3) over resource1. UE 115-g may transmit PSBCH2 over resource2.

Additionally, each UE 115 may determine if it is an in-coverage UE 115 or an out of coverage (OOC) UE 115. An in-coverage UE 115 may be a UE 115 that is within a coverage area of synchronization device 505 and an OOC UE 115 may be a UE 115 that is not within the coverage area of synchronization device 505. In the present example, UE 115-d may be an in-coverage UE 115 and UEs 115-e, 115-f, and 115-g may be OOC UEs 115.

In the present example, UEs 115-d and 115-f may transmit different PSBCH transmissions (e.g., PSBCH1 for UE 115-d and PSBCH3 for UE 115-f) over resource 1. As such, assuming that the transmission of PSBCH1 and that of PSBCH3 are not orthogonal, a UE 115 receiving the PSBCH transmissions may not be able to decode the transmissions. To enable the UE 115 to decode the transmissions, UE 115-d and 115-f may each select a respective OCC among a set of N (e.g., 2) configured OCCs (e.g., pre-configured OCCs) or may receive control signaling at some time when the UE 115-d and/or 115-f is connected to a base station 105 indicating the configured OCCs.

Which OCC a UE 115 chooses may be determined by hop number (e.g., a number of hops that the UE 115 is away from the synchronization device 305). For instance, an index of the OCC OCC_index may be determined as $$OCC_{index} = \mathrm{mod}\left(\left\lfloor \frac{n_{hop}}{N} \right\rfloor, N\right),$$

where $n_{hop}$ is the hop counter. In the present example, assuming N=2, the index of the OCC for UE 115-d may be $$OCC_{index} = \mathrm{mod}\left(\left\lfloor \frac{0}{2} \right\rfloor, 2\right) = 0$$

and the index of the OCC for UE 115-f may be $$OCC_{index} = \mathrm{mod}\left(\left\lfloor \frac{2}{2} \right\rfloor, 2\right) = 1.$$

As such, UEs 115-d and 115-f may use different OCCs and the UE 115 receiving PSBCH1 and PSBCH3 may be able to decode one or both transmissions.

In another example, which OCC a UE 115 chooses may be determined by SLSS ID. For instance, OCC_index may be determined as $OCC_{index} = \mathrm{mod}(\mathrm{mod}(SLSS_{ID}, M), N)$, where $SLSS_{ID}$ is an SLSS ID and M corresponds to a number of SLSS IDs (e.g., 336). Different UEs 115 may have different SLSS IDs if they have different synchronization sources. In one example, UE 115-f may transmit PSBCH3 on resource1 and another UE 115 synchronized to a different synchronization source (e.g., not UEs 115-e, 115-f, 115-g, or 115-h) may transmit PSBCH1 on resource1. Assuming that the SLSS ID of UE 115-f is 0, the SLSS ID of the other UE 115 is 133, M is 336, and N=2, the OCC index for UE 115-*f* may be OCC$_{index}$=mod(mod(0,336), 2)=0 and the OCC index for the other UE 115 may be OCC$_{index}$=mod(mod(133,336), 2)=1. As such UE 115-*d* and the other UE 115 may use different OCCs and the UE 115 receiving PSBCH1 and PSBCH3 may be able to decode one or both transmissions.

The symbols of the signals in the REs for the DMRS of a PSBCH transmission may be based on applying an OCC or cyclic shift to symbols modulated from a DMRS sequence generated from a DMRS sequence initialization value or seed. As noted herein, DMRS for PSBCHs that are orthogonal may have a same DMRS sequence. The value of the seed may depend on parameters based on the SLSS ID. As such, the DMRS sequence for the PSBCH transmissions of UEs 115-*d* and 115-*e* may be the same. In some examples, UEs 115-*d* and 115-*f* may have different SLSS IDs (e.g., UE 115-*d* may have an SLSS ID 0 and UE 115-*f* may have an SLSS ID 336), but the DMRS sequence may be the same. For instance, the UEs 115 may use a same initialization value for DMRS generation when one UE 115 has an SLSS ID of 0 and the other UE 115 has an SLSS ID of 336. It should be noted that there may other SLSS ID groups that may share the same DMRS sequence. In some cases, the DMRS symbol may be determined from a Gold sequence, where the seed of the second m-sequence of the Gold sequence may be the same as that used for DMRS sequence initialization value.

In some cases, a DMRS sequence may be a PN sequence or a Gold sequence (e.g., 0's and 1's). The sequence may be modulated to symbols (e.g., quadrature phase shift keying (QPSK) symbols) as a DMRS signal. The OCC code may be applied to the QPSK symbols (e.g., each entry of the OCC code may be multiplied with a respective QPSK symbol).

In some cases, there may be 672 SLSS IDs divided into two sets to indicate different synchronization priorities in a similar manner as that applied to LTE-V2X. A first set id_net may include {0, 1, ..., 335} and a second set id_oon may include {336, 337, 338, ..., 671}. The ID 0 may have the same use for NR as compared to the ID 0 in LTE; the ID 336 may have the same use for NR as compared to the ID 168 in LTE; and the ID 337 may have the same use as 169 in LTE.

Figure 4A:
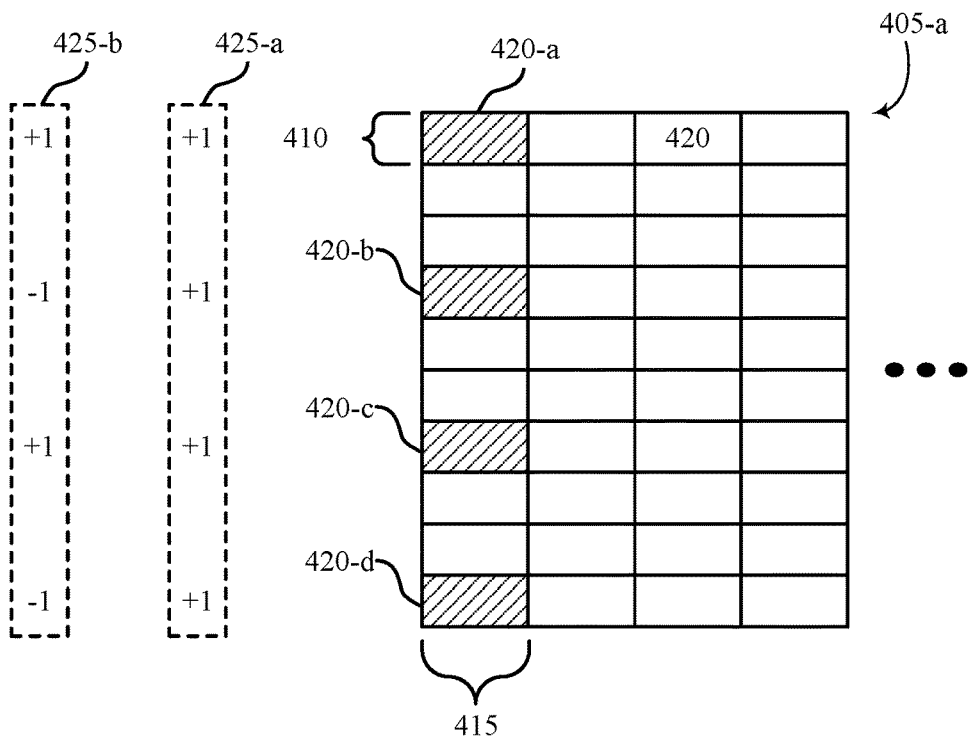
FIGS. 4A and 4B illustrate examples of broadcast resource diagrams in accordance with aspects of the present disclosure.
Figure 4B:
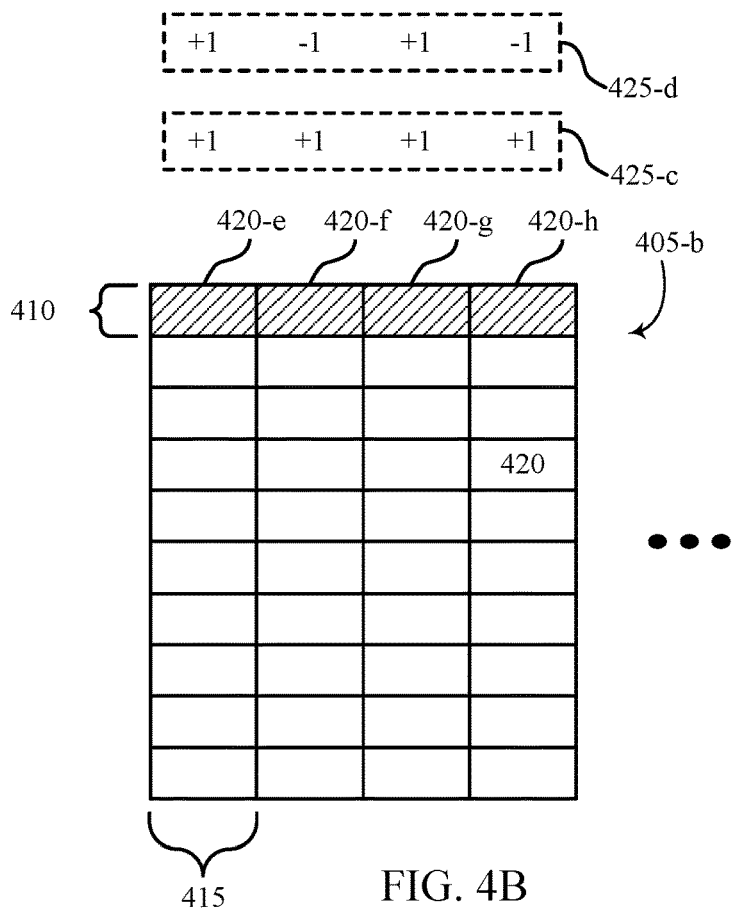

FIGS. 4A and 4B illustrate examples of broadcast resource diagrams 400-*a* and 400-*b* that support sidelink broadcast channel transmission in accordance with aspects of the present disclosure. Broadcast resource diagrams may represent the configuration of DMRS REs in a PSBCH resource 405.

The PSBCH resource 405-*a* of broadcast resource diagram 400-*a* may include a number of subcarriers 410 and a number of symbols 415 (e.g., OFDM symbols). Each of the subcarriers 410 and symbols 415 depicted may be used for PSBCH transmission. A particular subcarrier 410 with a particular symbol 415 may define a RE 420. The shaded REs 420 (e.g., REs 420-*a*, 420-*b*, 420-*c*, and 420-*d*) may be REs 420 for transmitting DMRS for PSBCH and the non-shaded REs 420 may be for signaling corresponding to the PSBCH transmission (e.g., the signaling of the payload).

In the present example, a first UE 115 may transmit a first PSBCH transmission and a second UE 115 may transmit a second PSBCH transmission over PSBCH resource 405-*a*. The DMRSs for each transmission may be transmitted over the same REs 420 (e.g., 420-*a*, 420-*b*, 420-*c*, 420-*d*). In some cases, each of the REs 420 for transmitting the DMRSs may be uniformly spaced and in subcarriers 410 that are not adjacent to other subcarriers 410.

An OCC 425 may be applied to the DMRS sequence along frequency for REs 420-*a*, 420-*b*, 420-*c*, and 420-*d*. A +1 in an OCC 425 being applied to a symbol of a DMRS sequence corresponding to a particular RE 420 may represent a modulated DMRS symbol in the particular RE 420 being multiplied with a +1 before transmission and a −1 in an OCC 425 may represent the modulated DMRS symbol in the particular RE 420 being multiplied with a −1 before transmission over that particular RE 420. In one example, for a first PSBCH transmission, OCC 425-*a* may be applied. For instance, a +1 may be applied to a symbol of the sequence corresponding to RE 420-*a*, a +1 may be applied to a symbol of the sequence corresponding to RE 420-*b*, a +1 may be applied to a symbol of the sequence corresponding to RE 420-*c*, and a +1 may be applied to a symbol of the sequence corresponding to RE 420-*d*. Similarly, for the second PSBCH transmission, OCC 425-*b* may be applied. A +1 may be applied to a symbol of the sequence corresponding to RE 420-*a*, a −1 may be applied to a symbol of the sequence corresponding to RE 420-*b*, a +1 may be applied to a symbol of the sequence corresponding to RE 420-*c*, and a −1 may be applied to a symbol of the sequence corresponding to RE 420-*d*. An OCC in the frequency domain on a uniformly spaced DMRS may be similar or equivalent to a cyclic shift in a time domain.

The PSBCH resource 405-*b* of broadcast resource diagram 400-*b* may include a number of subcarriers 410 and a number of symbols 415 (e.g., OFDM symbols). Each of the subcarriers 410 and the symbols 415 may be used for PSBCH transmission. A particular subcarrier 410 with a particular symbol 415 may define a RE 420. The shaded REs 420 (e.g., REs 420-*e*, 420-*f*, 420-*g*, and 420-*h*) may be REs 420 for transmitting DMRS for PSBCH and the non-shaded REs 420 may be for signaling corresponding to the PSBCH transmission (e.g., the signaling of the payload).

In the present example, a first UE 115 may transmit a first PSBCH transmission and a second UE 115 may transmit a second PSBCH transmission over PSBCH resource 405-*b*. The DMRSs for each transmission may be transmitted over the same REs 420 (e.g., 420-*e*, 420-*f*, 420-*g*, 420-*h*). Each RE 420 for transmitting the DMRSs in the present example may be in a same subcarrier 410 but different symbols 415.

An OCC 425 may be applied to the DMRS sequence along time for REs 420-*e*, 420-*f*, 420-*g*, and 420-*h*. In one example, for a first PSBCH transmission, OCC 425-*c* may be applied. For instance, a +1 may be applied to a symbol of the sequence corresponding to RE 420-*e*, a +1 may be applied to a symbol of the sequence corresponding to RE 420-*f*, a +1 may be applied to a symbol of the sequence corresponding to RE 420-*g*, and a +1 may be applied to a symbol of the sequence corresponding to RE 420-*h*. Similarly, for a second PSBCH transmission, OCC 425-*d* may be applied. For instance, a +1 may be applied to a symbol of the sequence corresponding to RE 420-*e*, a −1 may be applied to a symbol of the sequence corresponding to RE 420-*f*, a +1 may be applied to a symbol of the sequence corresponding to RE 420-*g*, and a −1 may be applied to a symbol of the sequence corresponding to RE 420-*h*.

Figure 5:
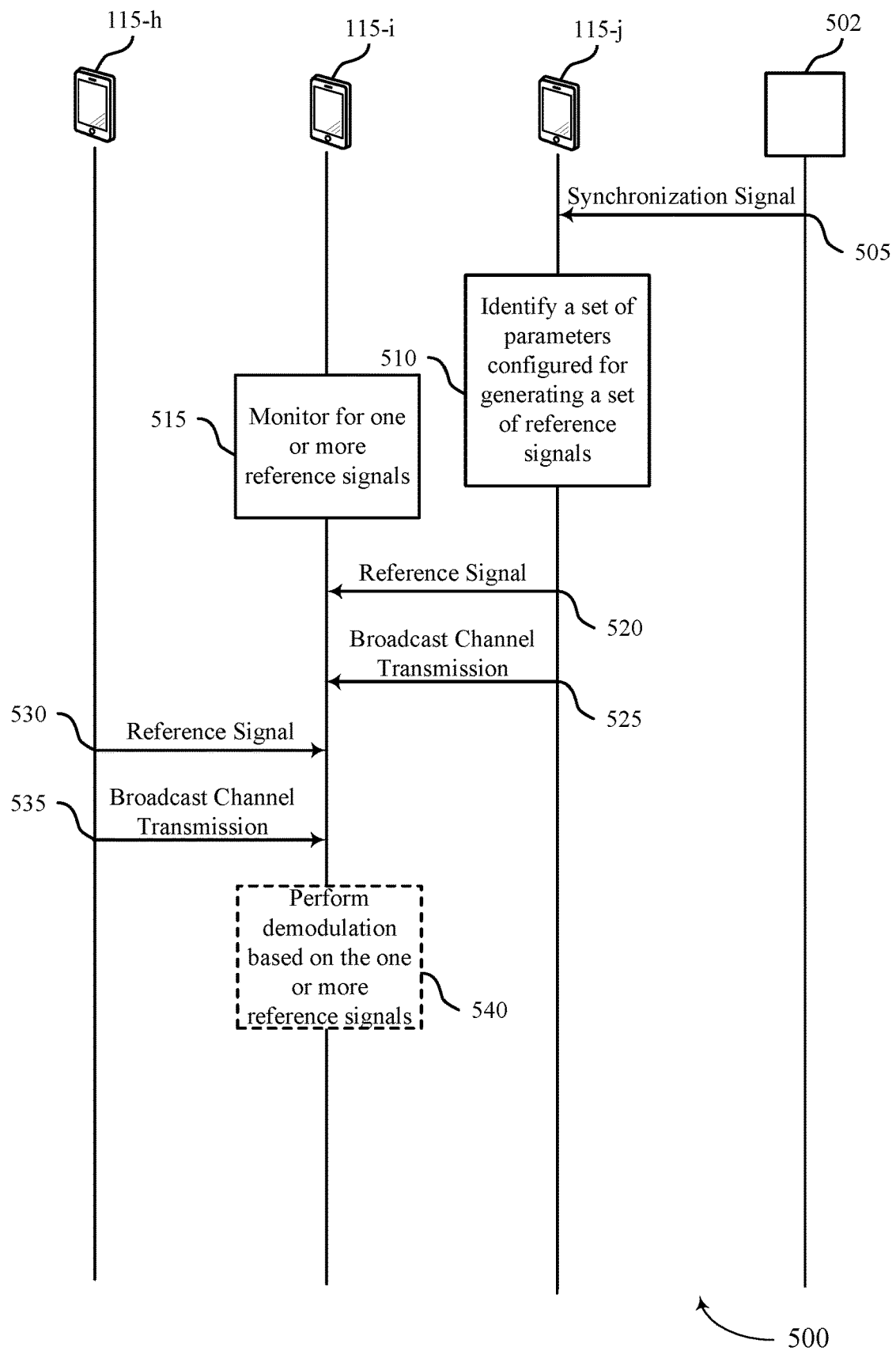
FIG. 5 illustrates an example of a process flow in accordance with aspects of the present disclosure.

FIG. 5 illustrates an example of a process flow 500 in accordance with aspects of the present disclosure. In some examples, process flow 500 may be implemented by aspects of wireless communications system 100. For instance, process flow 500 may be implemented by UEs 115-*h*, 115-*i*, and 115-*j*, which may be examples of UEs 115 as described with reference to FIG. 1. Additionally, process flow 500 may be implemented by a wireless device 502, which may be a UE 115, a base station 105, a synchronization device 305, or another wireless device. It should be noted that, in some cases, 515 may be performed as an alternative to 520, 525, and 530, or vice-versa.

At 505, wireless device 502 may transmit a sidelink synchronization signal. UE 115-*j* may receive the sidelink synchronization signal. In some cases, the sidelink synchronization signal may indicate an identifier of the sidelink synchronization signal or a number of hops between UE 115-*j* and a synchronization source, such as described with reference to FIG. 3.

At 510, UE 115-*j* may identify a set of parameters (e.g., cyclic cover shifts or OCCs) that are configured for generating a set of reference signals for transmission within a sidelink broadcast channel resource based on receiving the sidelink synchronization signal. In some cases, the set of parameters may be identified based on the identifier of the synchronization signal or the number of hops between UE 115-*j* and the synchronization source. The sidelink broadcast channel resource may be a resource within a transmission time interval.

At 515, UE 115-*i* may monitor, within the sidelink broadcast channel resource, for a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals. In some cases, UE 115-*i* may also monitor within the sidelink broadcast channel resource for the second reference signal. Prior to 515, UE 115-*i* may receive a sidelink synchronization signal (e.g., from wireless device 502 or another wireless device) and may identify the set of parameters in a similar fashion as UE 115-*j*.

In some cases, UE 115-*i* may monitor for the first reference signal within a set of subcarriers of the sidelink broadcast channel resource that are uniformly spaced in frequency, such as may be described with reference to FIG. 4A. In such cases, each of the set of subcarriers has at least one intervening subcarrier therebetween. In other cases UE 115-*i* may monitor for the first reference signal within a set of symbol periods of the sidelink broadcast channel resource that are uniformly spaced in time. In such cases, each of the set of symbol periods may have at least one intervening symbol period therebetween.

In some cases, the reference signal sequence may be a demodulation reference signal sequence and the set of reference signals may be a set of demodulation reference signals. Additionally or alternatively, the reference signal sequence may be a Gold sequence. In some cases, UE 115-*i* may generate the reference signal sequence based on initializing a pseudo random sequence generator with an initialization value that is also known by and used by UE 115-*j* for generating the same reference signal sequence.

At 520, UE 115-*j* may transmit, within the sidelink broadcast channel resource, the first reference signal of the set of reference signals. UE 115-*i* may receive the first reference signal. The first reference signal may be generated based on applying, to a reference signal sequence, a first parameter of the set of parameters that is orthogonal to a second parameter of the set of parameters that is applied to the reference signal sequence to generate a second reference signal of the set of reference signals. UE 115-*i* may receive the first reference signal.

In some cases, the first reference signal may be transmitted within a set of subcarriers of the sidelink broadcast channel resource that are uniformly spaced in frequency, such as may be described with reference to FIG. 4A. In such cases, each of the set of subcarriers may have at least one intervening subcarrier therebetween. In other cases, the first reference signal may be transmitted within a set of symbol periods of the sidelink broadcast channel resource that are uniformly spaced in time, such as may be described with reference to FIG. 4. In such cases, each of the set of symbol periods has at least one intervening symbol period therebetween.

In some cases, UE 115-*i* may determine to apply the first parameter based on a function of a number of hops between the UE and a synchronization source for the sidelink synchronization signal $$\left(\text{e.g., } OCC_{index} = \text{mod}\left(\left\lfloor \frac{n_{hop}}{N} \right\rfloor, N\right)\right)$$

as described with reference to FIG. 3). In such cases, the function may be a modulo function. Alternatively, UE 115-*i* may determine to apply the first parameter based on a function of an identifier indicated in the sidelink synchronization signal (e.g., $CC_{index}=\text{mod}(\text{mod}(SLSS_{ID}, M), N)$ as described with reference to FIG. 3). In some examples, the function may be a modulo function.

In some cases, UE 115-*i* may generate a reference signal symbol based on the reference signal sequence and may generate the first reference signal based on apply the first parameter to the reference signal symbol. In such cases, the first parameter may be a first cyclic shift of the reference signal symbol that differs from the second parameter that is a second cyclic shift of the reference signal symbol. In some cases, the reference signal sequence may be a demodulation reference signal sequence and the set of reference signals may be a set of demodulation reference signals. Additionally or alternatively, the reference signal sequence may be a Gold sequence.

At 525, UE 115-*j* may transmit a first sidelink broadcast channel transmission that corresponds to the first reference signal of the set of reference signals. UE 115-*i* may receive the first sidelink broadcast channel transmission.

At 530, UE 115-*h* may transmit the second reference signal of the set of reference signals. UE 115-*i* may receive the second reference signal. At 535, UE 115-*h* may transmit a second sidelink broadcast channel transmission that corresponds to the second reference signal of the set of reference signals. UE 115-*h* may receive the second sidelink broadcast channel transmission.

At 540, UE 115-*i* may demodulate the sidelink broadcast channel resource based on the first reference signal to receive the first sidelink broadcast channel transmission. Additionally, UE 115-*i* may demodulate the sidelink broadcast channel resource based on the second reference signal to receive the second sidelink broadcast channel transmission.

Figure 6:
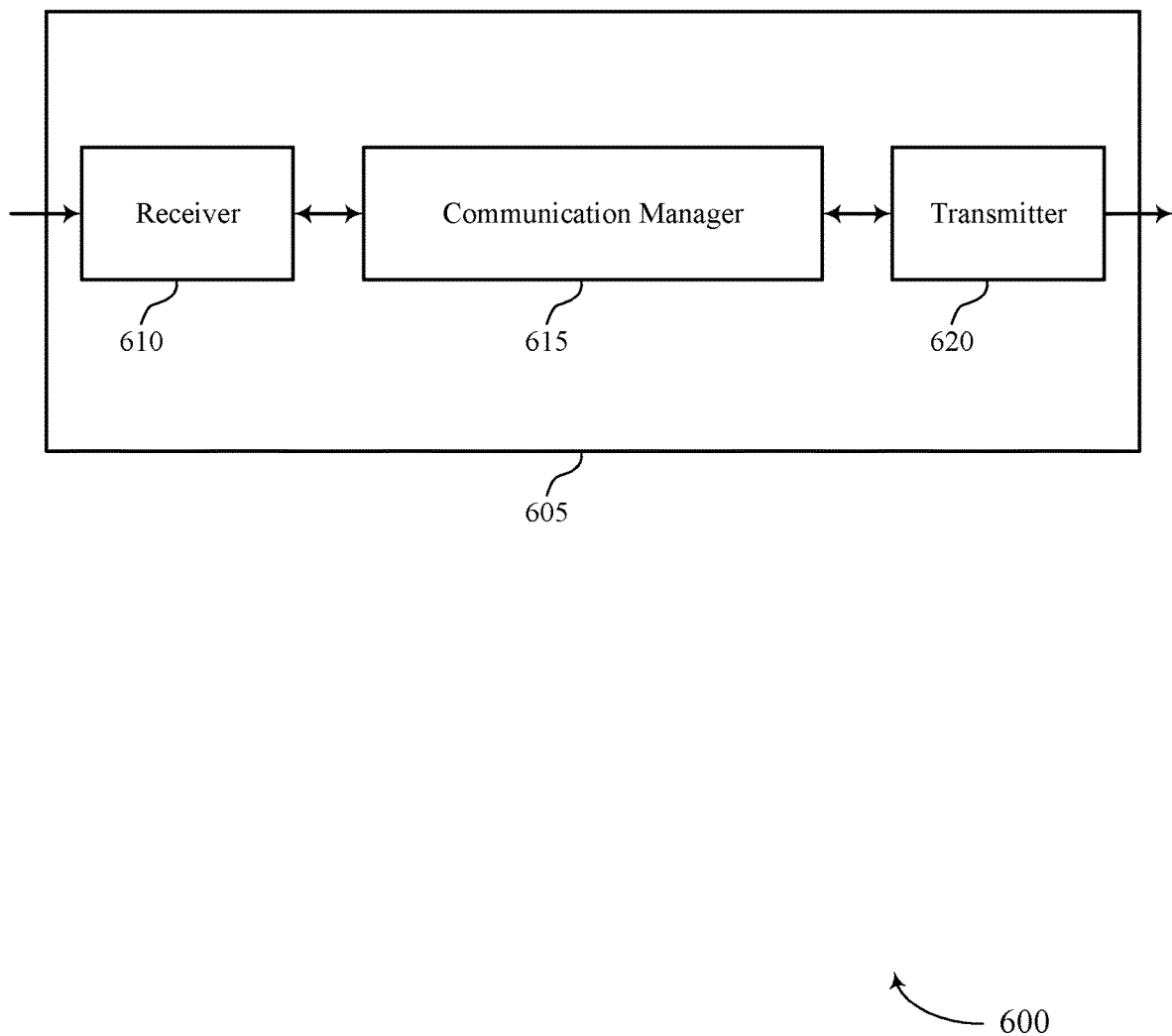
FIGS. 6 and 7 show block diagrams of devices that support sidelink broadcast channel transmission in accordance with aspects of the present disclosure.

FIG. 6 shows a block diagram 600 of a device 605 in accordance with aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to sidelink broadcast channel transmission, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may receive a sidelink synchronization signal, identify a set of parameters that are configured for generating a set of reference signals for transmission within a sidelink broadcast channel resource based on receiving the sidelink synchronization signal, and transmit, within the sidelink broadcast channel resource, a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals. The communication manager 615 may also receive a sidelink synchronization signal, identify a set of parameters that are configured for generating a set of reference signals for transmission within a sidelink broadcast channel resource based on receiving the sidelink synchronization signal, and monitor, within the sidelink broadcast channel resource, for a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals. The communication manager 615 may be an example of aspects of the communication manager 910 described herein.

In some examples, the methods performed by the communication manager 615 may have one or more advantages. For instance, by generating and/or monitoring for reference signals generated based on applying a first parameter that is orthogonal to a second parameter, the communication manager 615 may enable a UE to demodulate multiple different PSBCHs on a same sidelink broadcast channel. As such, the UE may acquire access to a greater amount of information and may be able to perform communications more efficiently according to the greater amount of information to which the UE has access.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

Figure 7:
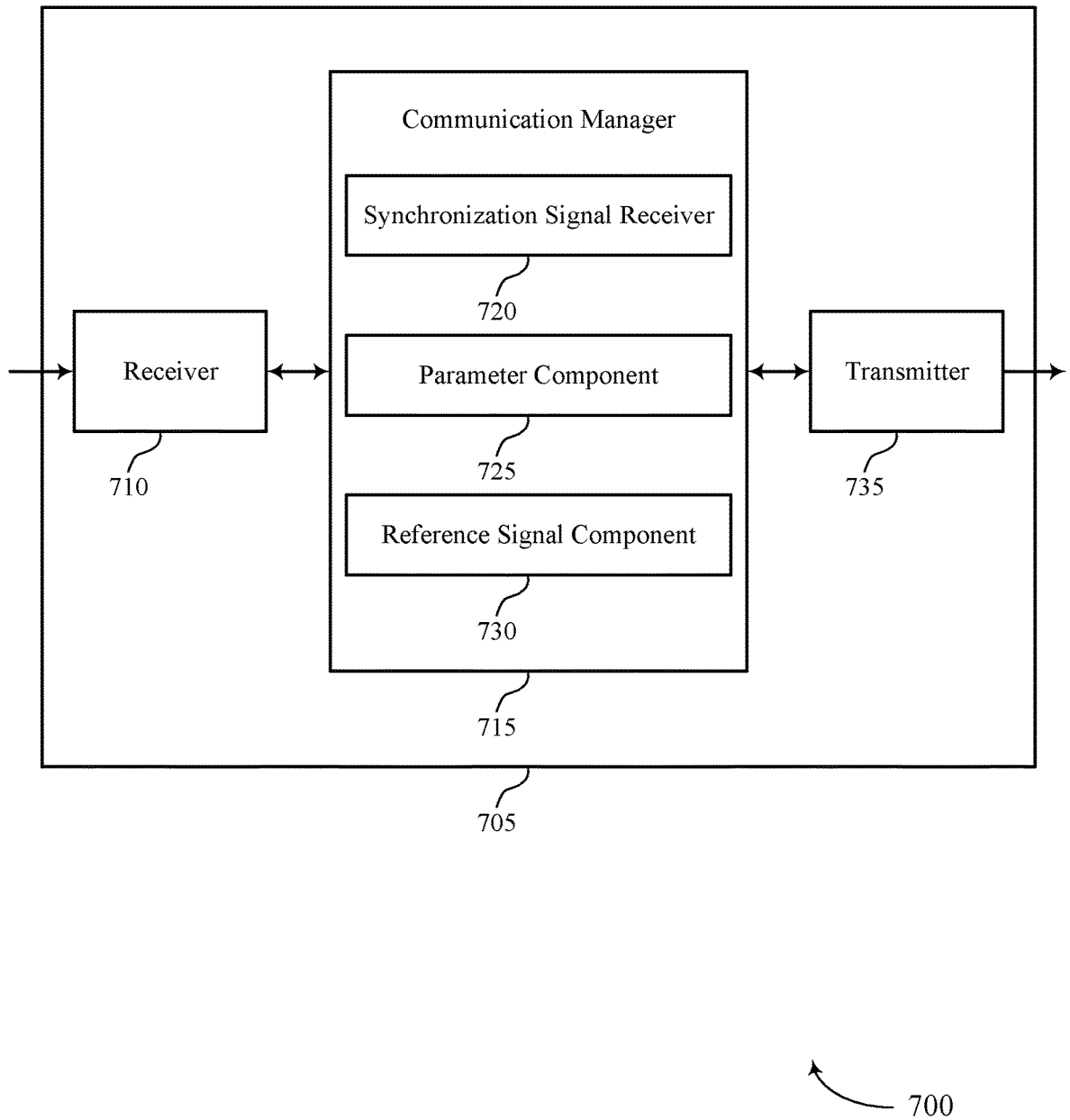

FIG. 7 shows a block diagram 700 of a device 705 in accordance with aspects of the present disclosure. The device 705 may be an example of aspects of a device 705, or a UE 115 as described herein. The device 705 may include a receiver 710, a communication manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to sidelink broadcast channel transmission, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 715 as described herein. The communication manager 715 may include a synchronization signal receiver 720, a parameter component 725, and a reference signal component 730. The communication manager 715 may be an example of aspects of the communication manager 910 described herein.

The synchronization signal receiver 720 may receive a sidelink synchronization signal.

The parameter component 725 may identify a set of parameters that are configured for generating a set of reference signals for transmission within a sidelink broadcast channel resource based on receiving the sidelink synchronization signal.

The reference signal component 730 may transmit, within the sidelink broadcast channel resource, a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals. The reference signal component 730 may monitor, within the sidelink broadcast channel resource, for a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals.

In some examples, the methods performed by the reference signal component 730 may have one or more advantages. For instance, by generating and/or monitoring for reference signals generated based on applying a first parameter that is orthogonal to a second parameter, the reference signal component 730 may enable a UE to demodulate multiple different PSBCHs on a same sidelink broadcast channel. As such, the UE may acquire access to a greater amount of information and may be able to perform communications more efficiently according to the greater amount of information to which the UE has access.

The transmitter 735 may transmit signals generated by other components of the device 705. In some examples, the transmitter 735 may be collocated with a receiver 710 in a transceiver module. For example, the transmitter 735 may be an example of aspects of the transceiver 915 described with reference to FIG. 9. The transmitter 735 may utilize a single antenna or a set of antennas.

Figure 8:
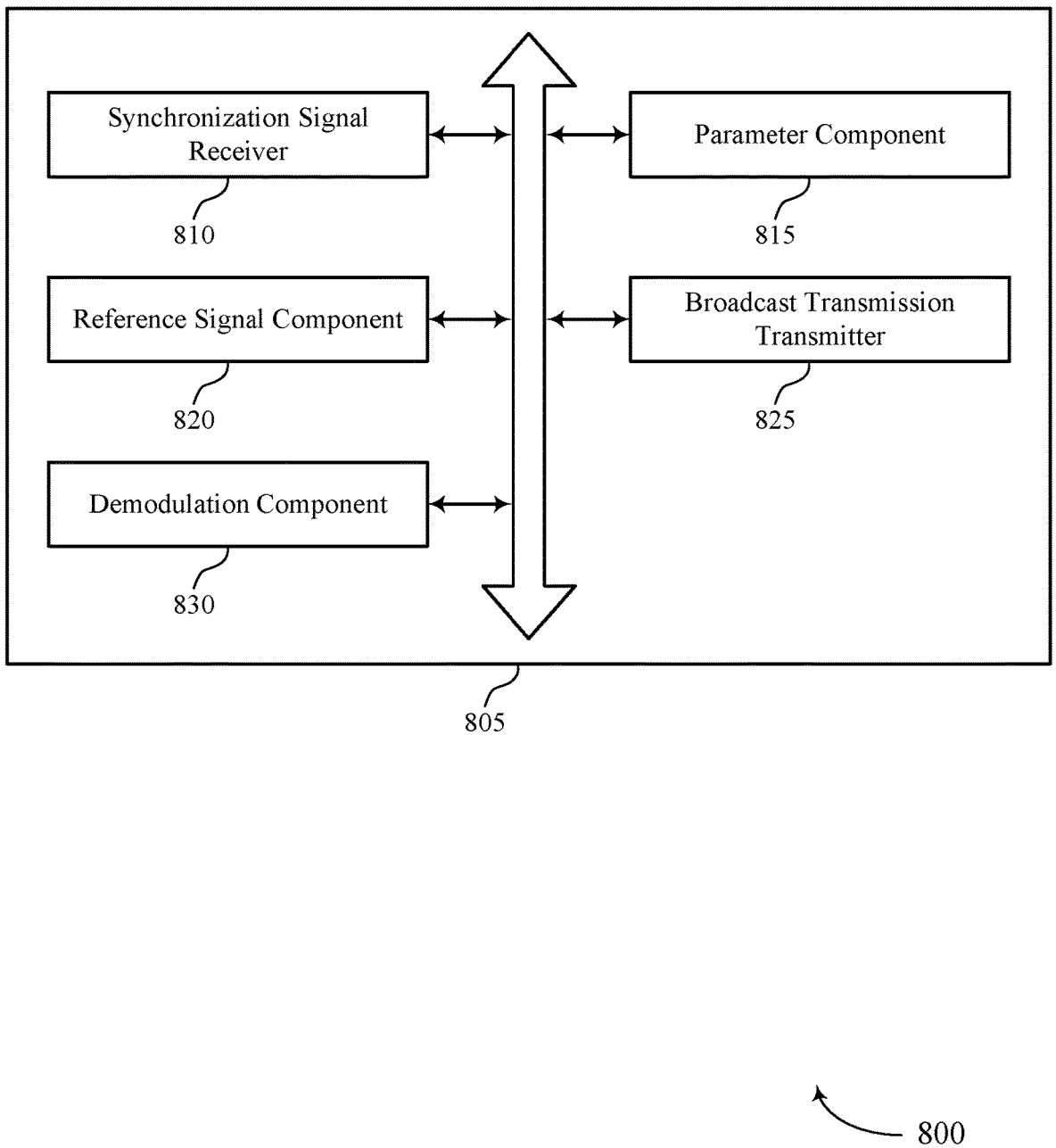
FIG. 8 shows a block diagram of a communication manager in accordance with aspects of the present disclosure.

FIG. 8 shows a block diagram 800 of a communication manager 805 in accordance with aspects of the present disclosure. The communication manager 805 may be an example of aspects of a communication manager 615, a communication manager 915, or a communication manager 910 described herein. The communication manager 805 may include a synchronization signal receiver 810, a parameter component 815, a reference signal component 820, a broadcast transmission transmitter 825, and a demodulation component 830. Each of these modules may communicate, directly or indirectly, with one another (e.g., via one or more buses).

The synchronization signal receiver 810 may receive a sidelink synchronization signal. In some examples, the synchronization signal receiver 810 may receive the sidelink synchronization signal that indicates an identifier of the sidelink synchronization signal, where the set of parameters are identified based on the identifier of the sidelink synchronization signal. In some examples, the synchronization signal receiver 810 may receive the sidelink synchronization signal that indicates a number of hops between the UE and a synchronization source for the sidelink synchronization signal, where the set of parameters are identified based on the number of hops.

The parameter component 815 may identify a set of parameters that are configured for generating a set of reference signals for transmission within a sidelink broadcast channel resource based on receiving the sidelink synchronization signal. In some examples, the parameter component 815 may determine to apply the first parameter based at least on a function of a number of hops between the UE and a synchronization source for the sidelink synchronization signal. In some examples, the parameter component 815 may determine to apply the first parameter based at least on a function of an identifier indicated in the sidelink synchronization signal.

The reference signal component 820 may transmit, within the sidelink broadcast channel resource, a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals. In some examples, the reference signal component 820 may monitor, within the sidelink broadcast channel resource, for a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals. In some examples, the reference signal component 820 may transmit the first reference signal within a set of subcarriers of the sidelink broadcast channel resource that are uniformly spaced in frequency.

In some examples, the reference signal component 820 may transmit the first reference signal within a set of symbol periods of the sidelink broadcast channel resource that are uniformly spaced in time. In some examples, the reference signal component 820 may generate a reference signal symbol based on the reference signal sequence. In some examples, the reference signal component 820 may generate the first reference signal based on applying the first parameter to the reference signal symbol. In some examples, the reference signal component 820 may generate the reference signal sequence based on initializing a pseudo random sequence generator with an initialization value. In some examples, the reference signal component 820 may monitor, within the sidelink broadcast channel resource, for the second reference signal.

In some examples, the reference signal component 820 may receive, within the sidelink broadcast channel resource, the first reference signal based on the first parameter and the second reference signal based on the second parameter. In some examples, the reference signal component 820 may monitor for the first reference signal within a set of subcarriers of the sidelink broadcast channel resource that are uniformly spaced in frequency. In some examples, the reference signal component 820 may monitor for the first reference signal within a set of symbol periods of the sidelink broadcast channel resource that are uniformly spaced in time. In some examples, the reference signal component 820 may generate the reference signal sequence based on initializing a pseudo random sequence generator with an initialization value.

In some examples, the methods performed by the reference signal component 820 may have one or more advantages. For instance, by generating and/or monitoring for reference signals generated based on applying a first parameter that is orthogonal to a second parameter, the reference signal component 820 may enable a UE to demodulate multiple different PSBCHs on a same sidelink broadcast channel. As such, the UE may acquire access to a greater amount of information and may be able to perform communications more efficiently according to the greater amount of information to which the UE has access.

The broadcast transmission transmitter 825 may transmit, within the sidelink broadcast channel resource, a first sidelink broadcast transmission that corresponds to the first reference signal.

The demodulation component 830 may demodulate the sidelink broadcast channel resource based on the first reference signal to receive a first sidelink broadcast channel transmission. In some examples, the demodulation component 830 may demodulate the sidelink broadcast channel resource based on the second reference signal to receive a second sidelink broadcast channel transmission.

Figure 9:
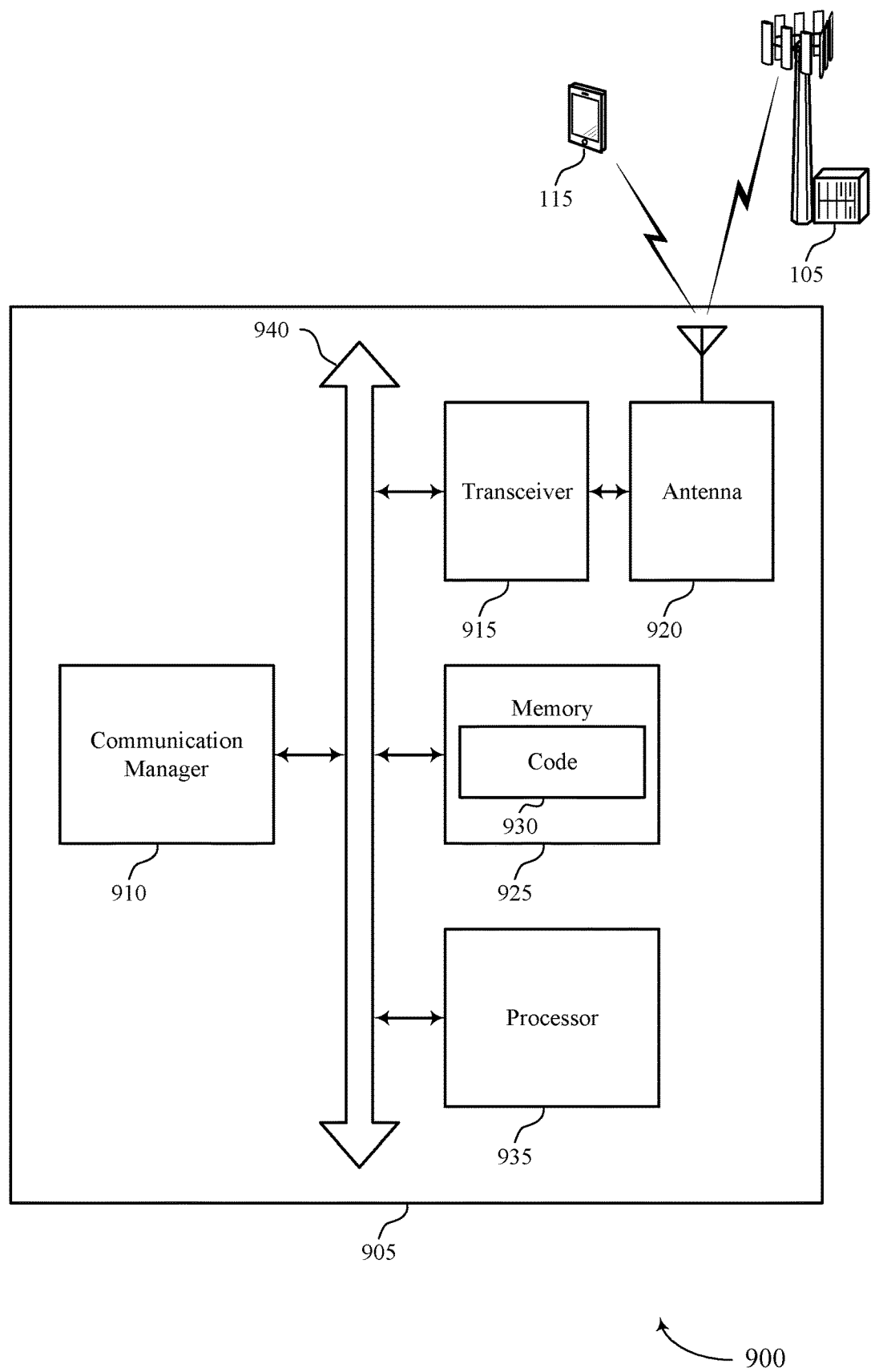
FIG. 9 shows a diagram of a system including a device in accordance with aspects of the present disclosure.

FIG. 9 shows a diagram of a system 900 including a device 905 in accordance with aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may receive a sidelink synchronization signal, identify a set of parameters that are configured for generating a set of reference signals for transmission within a sidelink broadcast channel resource based on receiving the sidelink synchronization signal, and transmit, within the sidelink broadcast channel resource, a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals. The communication manager 910 may also receive a sidelink synchronization signal, identify a set of parameters that are configured for generating a set of reference signals for transmission within a sidelink broadcast channel resource based on receiving the sidelink synchronization signal, and monitor, within the sidelink broadcast channel resource, for a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals.

In some examples, the methods performed by the communication manager 910 may have one or more advantages. For instance, by generating and/or monitoring for reference signals generated based on applying a first parameter that is orthogonal to a second parameter, the communication manager 910 may enable a UE to demodulate multiple different PSBCHs on a same sidelink broadcast channel. As such, the UE may acquire access to a greater amount of information and may be able to perform communications more efficiently according to the greater amount of information to which the UE has access.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting sidelink broadcast channel transmission).

Figure 10:
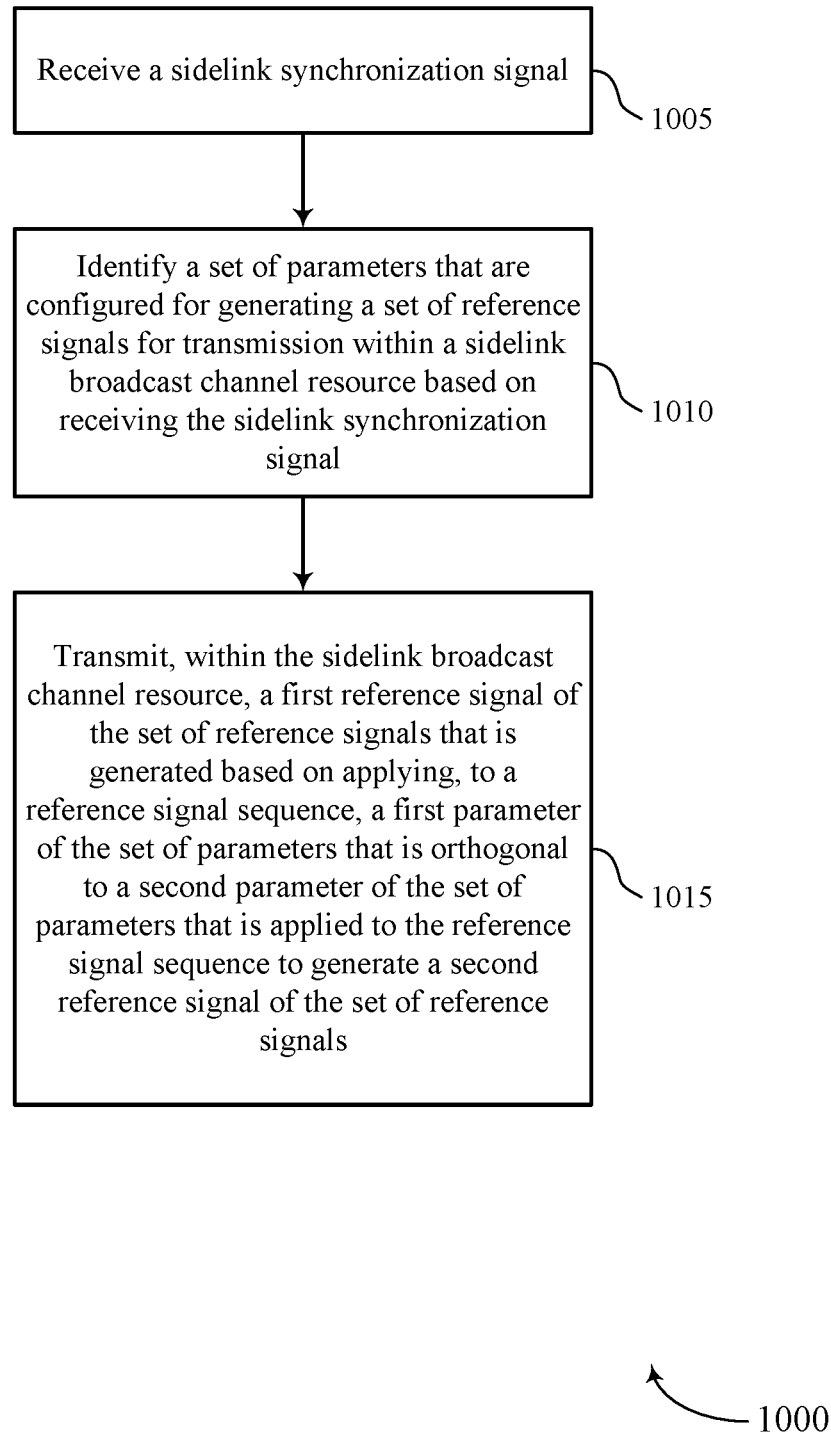
FIGS. 10 through 14 show flowcharts illustrating methods that support sidelink broadcast channel transmission in accordance with aspects of the present disclosure.

FIG. 10 shows a flowchart illustrating a method 1000 in accordance with aspects of the present disclosure. The operations of method 1000 may be implemented by a UE 115 or its components as described herein. For example, the operations of method 1000 may be performed by a communication manager as described with reference to FIGS. 6 through 8. In some examples, a UE may execute a set of instructions to control the functional elements of the UE to perform the described functions. Additionally or alternatively, a UE may perform aspects of the described functions using special-purpose hardware.

At 1005, the UE may receive a sidelink synchronization signal. The operations of 05 may be performed according to the methods described herein. In some examples, aspects of the operations of 1005 may be performed by a synchronization signal receiver as described with reference to FIGS. 6 through 8.

At 1010, the UE may identify a set of parameters that are configured for generating a set of reference signals for transmission within a sidelink broadcast channel resource based on receiving the sidelink synchronization signal. The operations of 1010 may be performed according to the methods described herein. In some examples, aspects of the operations of 1010 may be performed by a parameter component as described with reference to FIGS. 6 through 8.

At 1015, the UE may transmit, within the sidelink broadcast channel resource, a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals. The operations of 1015 may be performed according to the methods described herein. In some examples, aspects of the operations of 1015 may be performed by a reference signal component as described with reference to FIGS. 6 through 8.

Figure 11:
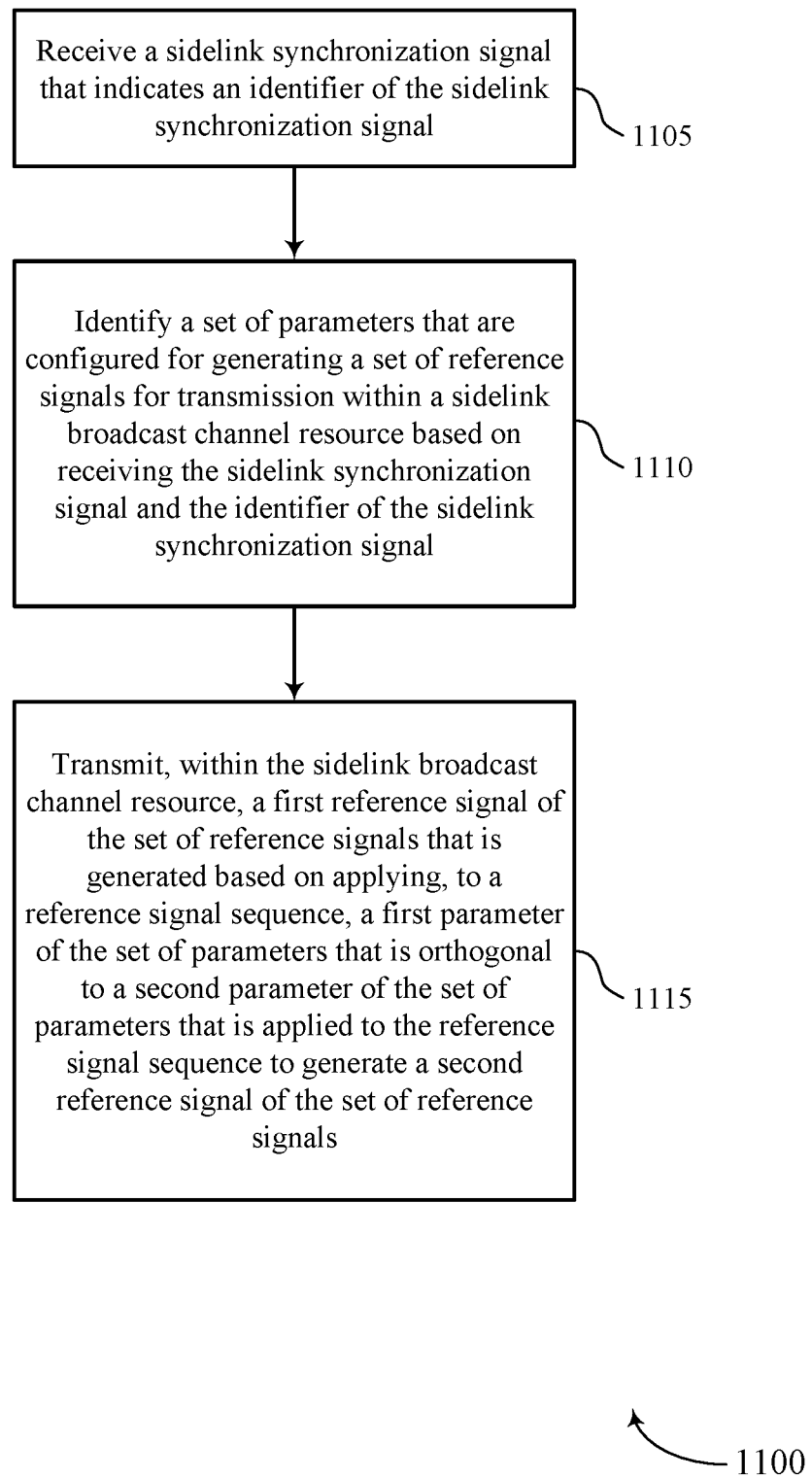

FIG. 11 shows a flowchart illustrating a method 1100 in accordance with aspects of the present disclosure. The operations of method 1100 may be implemented by a UE 115 or its components as described herein. For example, the operations of method 1100 may be performed by a communication manager as described with reference to FIGS. 6 through 8. In some examples, a UE may execute a set of instructions to control the functional elements of the UE to perform the described functions. Additionally or alternatively, a UE may perform aspects of the described functions using special-purpose hardware.

At 1105, the UE may receive a sidelink synchronization signal that indicates an identifier of the sidelink synchronization signal. The operations of 1105 may be performed according to the methods described herein. In some examples, aspects of the operations of 1105 may be performed by a synchronization signal receiver as described with reference to FIGS. 6 through 8.

At 1110, the UE may identify a set of parameters that are configured for generating a set of reference signals for transmission within a sidelink broadcast channel resource based on receiving the sidelink synchronization signal and the identifier of the sidelink synchronization signal. The operations of 1110 may be performed according to the methods described herein. In some examples, aspects of the operations of 1110 may be performed by a parameter component as described with reference to FIGS. 6 through 8.

At 1115, the UE may transmit, within the sidelink broadcast channel resource, a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals. The operations of 1115 may be performed according to the methods described herein. In some examples, aspects of the operations of 1115 may be performed by a reference signal component as described with reference to FIGS. 6 through 8.

Figure 12:
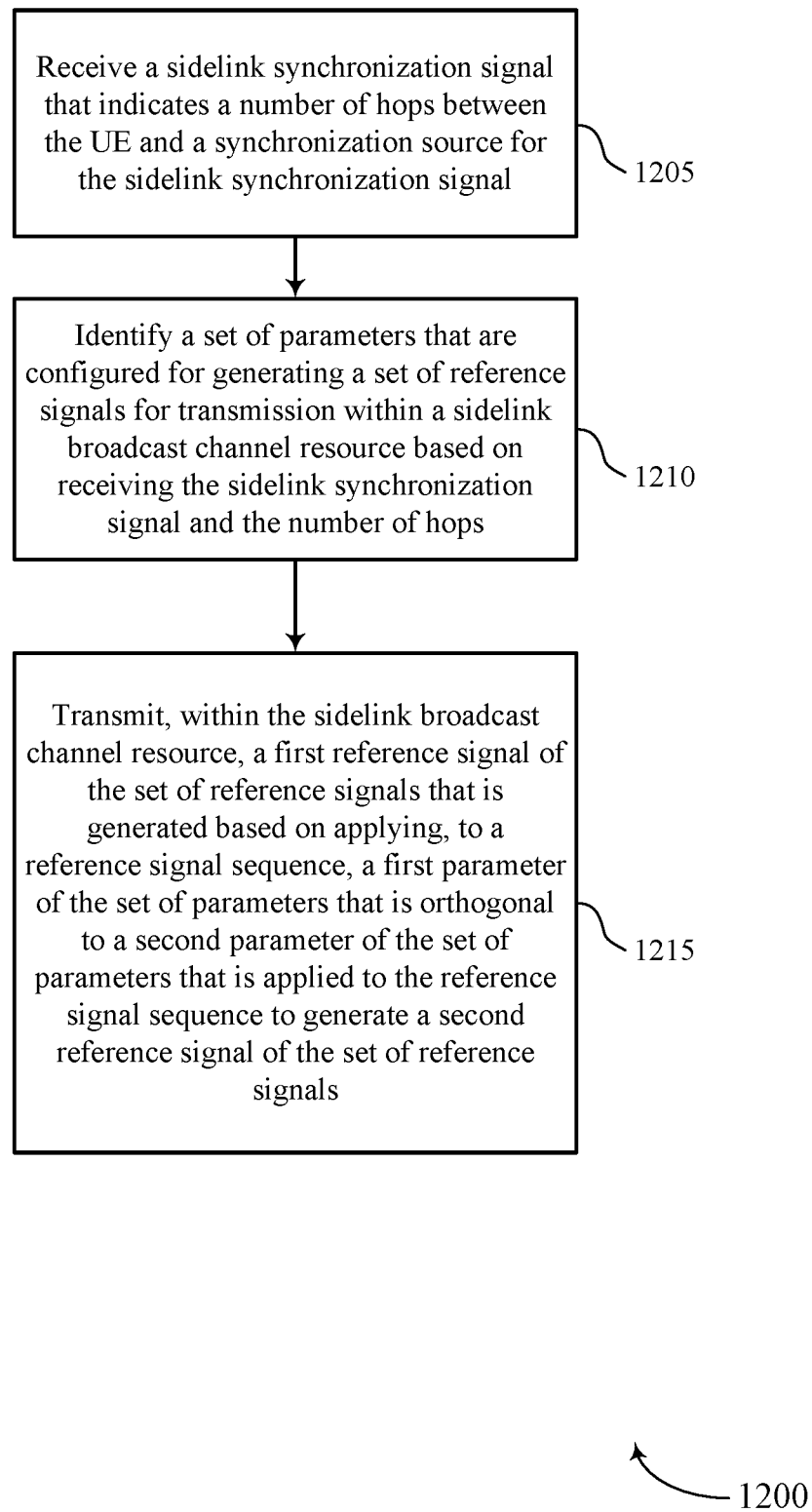

FIG. 12 shows a flowchart illustrating a method 1200 in accordance with aspects of the present disclosure. The operations of method 1200 may be implemented by a UE 115 or its components as described herein. For example, the operations of method 1200 may be performed by a communication manager as described with reference to FIGS. 6 through 8. In some examples, a UE may execute a set of instructions to control the functional elements of the UE to perform the described functions. Additionally or alternatively, a UE may perform aspects of the described functions using special-purpose hardware.

At 1205, the UE may receive a sidelink synchronization signal that indicates a number of hops between the UE and a synchronization source for the sidelink synchronization signal. The operations of 1205 may be performed according to the methods described herein. In some examples, aspects of the operations of 1205 may be performed by a synchronization signal receiver as described with reference to FIGS. 6 through 8.

At 1210, the UE may identify a set of parameters that are configured for generating a set of reference signals for transmission within a sidelink broadcast channel resource based on receiving the sidelink synchronization signal and the number of hops. The operations of 1210 may be performed according to the methods described herein. In some examples, aspects of the operations of 1210 may be performed by a parameter component as described with reference to FIGS. 6 through 8.

At 1215, the UE may transmit, within the sidelink broadcast channel resource, a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals. The operations of 1215 may be performed according to the methods described herein. In some examples, aspects of the operations of 1215 may be performed by a reference signal component as described with reference to FIGS. 6 through 8.

Figure 13:
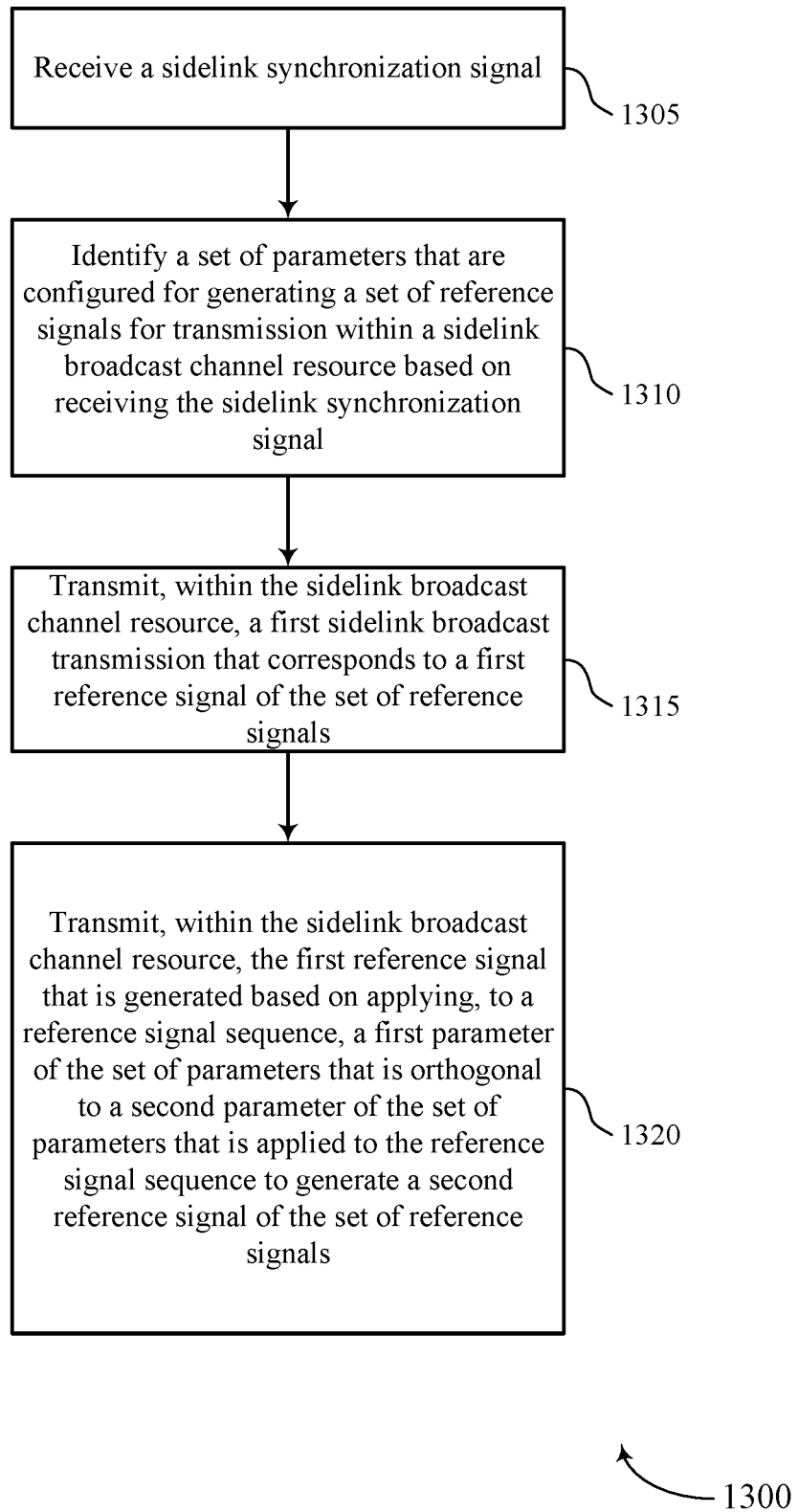

FIG. 13 shows a flowchart illustrating a method 1300 in accordance with aspects of the present disclosure. The operations of method 1300 may be implemented by a UE 115 or its components as described herein. For example, the operations of method 1300 may be performed by a communication manager as described with reference to FIGS. 6 through 8. In some examples, a UE may execute a set of instructions to control the functional elements of the UE to perform the described functions. Additionally or alternatively, a UE may perform aspects of the described functions using special-purpose hardware.

At 1305, the UE may receive a sidelink synchronization signal. The operations of 05 may be performed according to the methods described herein. In some examples, aspects of the operations of 1305 may be performed by a synchronization signal receiver as described with reference to FIGS. 6 through 8.

At 1310, the UE may identify a set of parameters that are configured for generating a set of reference signals for transmission within a sidelink broadcast channel resource based on receiving the sidelink synchronization signal. The operations of 1310 may be performed according to the methods described herein. In some examples, aspects of the operations of 1310 may be performed by a parameter component as described with reference to FIGS. 6 through 8.

At 1315, the UE may transmit, within the sidelink broadcast channel resource, a first sidelink broadcast transmission that corresponds to a first reference signal of the set of reference signals. The operations of 1315 may be performed according to the methods described herein. In some examples, aspects of the operations of 1315 may be performed by a broadcast transmission transmitter as described with reference to FIGS. 6 through 8.

At 1320, the UE may transmit, within the sidelink broadcast channel resource, the first reference signal that is generated based on applying, to a reference signal sequence, a first parameter of the set of parameters that is orthogonal to a second parameter of the set of parameters that is applied to the reference signal sequence to generate a second reference signal of the set of reference signal. The operations of 1320 may be performed according to the methods described herein. In some examples, aspects of the operations of 1320 may be performed by a reference signal component as described with reference to FIGS. 6 through 8.

Figure 14:
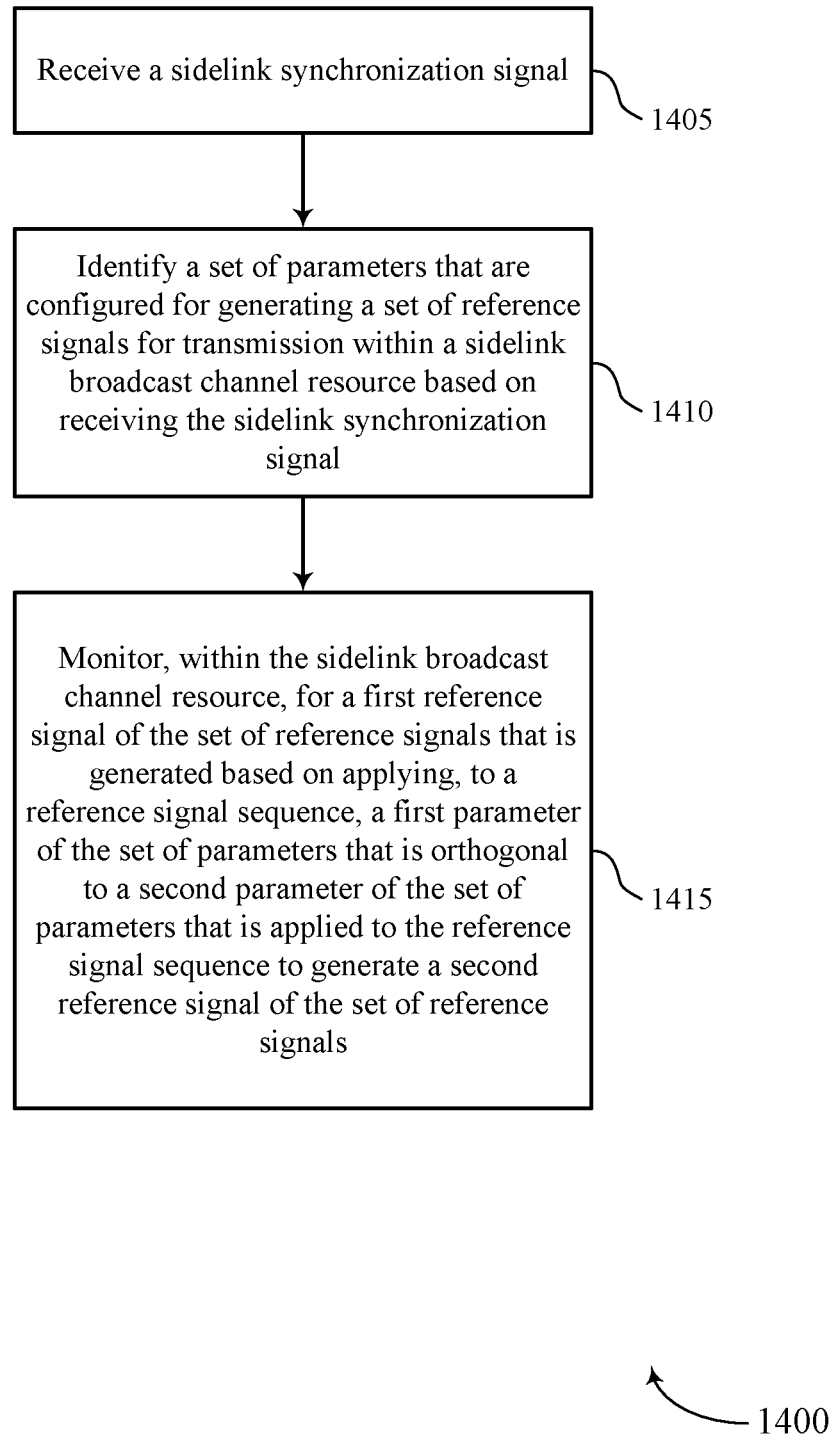

FIG. 14 shows a flowchart illustrating a method 1400 in accordance with aspects of the present disclosure. The operations of method 1400 may be implemented by a UE 115 or its components as described herein. For example, the operations of method 1400 may be performed by a communication manager as described with reference to FIGS. 6 through 8. In some examples, a UE may execute a set of instructions to control the functional elements of the UE to perform the described functions. Additionally or alternatively, a UE may perform aspects of the described functions using special-purpose hardware.

At 1405, the UE may receive a sidelink synchronization signal. The operations of 1405 may be performed according to the methods described herein. In some examples, aspects of the operations of 1405 may be performed by a synchronization signal receiver as described with reference to FIGS. 6 through 8.

At 1410, the UE may identify a set of parameters that are configured for generating a set of reference signals for transmission within a sidelink broadcast channel resource based on receiving the sidelink synchronization signal. The operations of 1410 may be performed according to the methods described herein. In some examples, aspects of the operations of 1410 may be performed by a parameter component as described with reference to FIGS. 6 through 8.

At 1415, the UE may monitor, within the sidelink broadcast channel resource, for a first reference signal of the set of reference signals that is generated based on applying, to a reference signal sequence, a first parameter of the set of parameters that is orthogonal to a second parameter of the set of parameters that is applied to the reference signal sequence to generate a second reference signal of the set of reference signals. The operations of 1415 may be performed according to the methods described herein. In some examples, aspects of the operations of 1415 may be performed by a reference signal component as described with reference to FIGS. 6 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:

receiving a sidelink synchronization signal;
identifying a plurality of parameters that are configured for generating, from a same reference signal sequence, a plurality of reference signals for transmission within a sidelink broadcast channel resource based at least in part on receiving the sidelink synchronization signal;
transmitting, within the sidelink broadcast channel resource, a first reference signal of the plurality of reference signals that is generated based at least in part on applying, to the same reference signal sequence, a first parameter of the plurality of parameters that is orthogonal to a second parameter of the plurality of parameters that is applied to the same reference signal sequence to generate a second reference signal of the plurality of reference signals, the first reference signal corresponding to a first sidelink broadcast transmission and the second reference signal corresponding to a second sidelink broadcast transmission; and
transmitting, within the sidelink broadcast channel resource, the first sidelink broadcast transmission via at least one same resource element as a transmission of the second sidelink broadcast transmission.

2. The method of claim 1, wherein receiving the sidelink synchronization signal comprises:
receiving the sidelink synchronization signal that indicates an identifier of the sidelink synchronization signal, wherein the plurality of parameters are identified based at least in part on the identifier of the sidelink synchronization signal.

3. The method of claim 1, wherein receiving the sidelink synchronization signal comprises:
receiving the sidelink synchronization signal that indicates a number of hops between the UE and a synchronization source for the sidelink synchronization signal, wherein the plurality of parameters are identified based at least in part on the number of hops.

4. The method of claim 1, wherein transmitting the first reference signal comprises:
transmitting the first reference signal within a plurality of subcarriers of the sidelink broadcast channel resource that are uniformly spaced in frequency.

5. The method of claim 4, wherein each of the plurality of subcarriers has at least one intervening subcarrier therebetween.

6. The method of claim 1, wherein transmitting the first reference signal comprises:
transmitting the first reference signal within a plurality of symbol periods of the sidelink broadcast channel resource that are uniformly spaced in time.

7. The method of claim 6, wherein each of the plurality of symbol periods has at least one intervening symbol period therebetween.

8. The method of claim 1, further comprising:
determining to apply the first parameter based at least on a function of a number of hops between the UE and a synchronization source for the sidelink synchronization signal.

9. The method of claim 8, wherein the function is a modulo function.

10. The method of claim 1, further comprising:
determining to apply the first parameter based at least on a function of an identifier indicated in the sidelink synchronization signal.

11. The method of claim 10, wherein the function is a modulo function.

12. The method of claim 1, further comprising:
generating a reference signal symbol based at least in part on the same reference signal sequence; and
generating the first reference signal based at least in part on applying the first parameter to the reference signal symbol.

13. The method of claim 12, wherein the first parameter is a first cyclic shift of the reference signal symbol that differs from the second parameter that is a second cyclic shift of the reference signal symbol.

14. The method of claim 1, wherein the same reference signal sequence is a demodulation reference signal sequence and the plurality of reference signals are a plurality of demodulation reference signals.

15. The method of claim 1, wherein the plurality of parameters are a plurality of orthogonal cover codes.

16. The method of claim 1, wherein the same reference signal sequence is a Gold sequence.

17. The method of claim 1, wherein the sidelink broadcast channel resource is a resource within a transmission time interval.

18. The method of claim 1, further comprising:
generating the same reference signal sequence based at least in part on initializing a pseudo random sequence generator with an initialization value.

19. A method for wireless communications by a user equipment (UE), comprising:
receiving a sidelink synchronization signal;
identifying a plurality of parameters that are configured for generating, from a same reference signal sequence, a plurality of reference signals for transmission within a sidelink broadcast channel resource based at least in part on receiving the sidelink synchronization signal;
receiving, within the sidelink broadcast channel resource, a first reference signal of the plurality of reference signals that is generated based at least in part on applying, to the same reference signal sequence, a first parameter of the plurality of parameters that is orthogonal to a second parameter of the plurality of parameters that is applied to the same reference signal sequence to generate a second reference signal of the plurality of reference signals, the first reference signal corresponding to a first sidelink broadcast transmission and the second reference signal corresponding to a second sidelink broadcast transmission; and
demodulating the sidelink broadcast channel resource based at least in part on the first reference signal to receive the first sidelink broadcast transmission via at least one same resource element as a transmission of the second sidelink broadcast transmission.

20. The method of claim 19, further comprising:
monitoring, within the sidelink broadcast channel resource, for the second reference signal.

21. The method of claim 19, further comprising:
receiving, within the sidelink broadcast channel resource, the second reference signal based at least in part on the second parameter; and
demodulating the sidelink broadcast channel resource based at least in part on the second reference signal to receive the second sidelink broadcast transmission.

22. The method of claim 19, wherein receiving the sidelink synchronization signal comprises:
receiving the sidelink synchronization signal that indicates an identifier of the sidelink synchronization signal, wherein the plurality of parameters are identified based at least in part on the identifier of the sidelink synchronization signal.

23. The method of claim 19, wherein receiving the sidelink synchronization signal comprises:
  receiving the sidelink synchronization signal that indicates a number of hops between the UE and a synchronization source for the sidelink synchronization signal, wherein the plurality of parameters are identified based at least in part on the number of hops.

24. The method of claim 19, further comprising:
  monitoring for the first reference signal within a plurality of subcarriers of the sidelink broadcast channel resource that are uniformly spaced in frequency.

25. The method of claim 24, wherein each of the plurality of subcarriers has at least one intervening subcarrier therebetween.

26. The method of claim 19, further comprising:
  monitoring for the first reference signal within a plurality of symbol periods of the sidelink broadcast channel resource that are uniformly spaced in time.

27. The method of claim 26, wherein each of the plurality of symbol periods has at least one intervening symbol period therebetween.

28. The method of claim 19, wherein the same reference signal sequence is a demodulation reference signal sequence and the plurality of reference signals are a plurality of demodulation reference signals.

29. The method of claim 19, wherein the plurality of parameters are a plurality of orthogonal cover codes.

30. The method of claim 19, wherein the same reference signal sequence is a Gold sequence.

31. The method of claim 19, wherein the sidelink broadcast channel resource is a resource within a transmission time interval.

32. The method of claim 19, further comprising:
  generating the same reference signal sequence based at least in part on initializing a pseudo random sequence generator with an initialization value.

33. An apparatus for wireless communications by a user equipment (UE), comprising:
  a processor,
  memory in electronic communication with the processor, and
  instructions stored in the memory and executable by the processor to cause the apparatus to:
    receive a sidelink synchronization signal;
    identify a plurality of parameters that are configured for generating, from a same reference signal sequence, a plurality of reference signals for transmission within a sidelink broadcast channel resource based at least in part on receiving the sidelink synchronization signal;
    transmit, within the sidelink broadcast channel resource, a first reference signal of the plurality of reference signals that is generated based at least in part on applying, to the same reference signal sequence, a first parameter of the plurality of parameters that is orthogonal to a second parameter of the plurality of parameters that is applied to the same reference signal sequence to generate a second reference signal of the plurality of reference signals, the first reference signal corresponding to a first sidelink broadcast transmission and the second reference signal corresponding to a second sidelink broadcast transmission; and
    transmit, within the sidelink broadcast channel resource, the first sidelink broadcast transmission via at least one same resource element as a transmission of the second sidelink broadcast transmission.

34. The apparatus of claim 33, further comprising a receiver, wherein the instructions to receive the sidelink synchronization signal are executable by the processor to cause the apparatus to:
  receive, via the receiver, the sidelink synchronization signal that indicates an identifier of the sidelink synchronization signal, wherein the plurality of parameters are identified based at least in part on the identifier of the sidelink synchronization signal.

35. The apparatus of claim 33, wherein the instructions to receive the sidelink synchronization signal are executable by the processor to cause the apparatus to:
  receive the sidelink synchronization signal that indicates a number of hops between the UE and a synchronization source for the sidelink synchronization signal, wherein the plurality of parameters are identified based at least in part on the number of hops.

36. The apparatus of claim 33, wherein the instructions to transmit the first reference signal are executable by the processor to cause the apparatus to:
  transmit the first reference signal within a plurality of subcarriers of the sidelink broadcast channel resource that are uniformly spaced in frequency.

37. The apparatus of claim 36, wherein each of the plurality of subcarriers has at least one intervening subcarrier therebetween.

38. The apparatus of claim 33, wherein the instructions to transmit the first reference signal are executable by the processor to cause the apparatus to:
  transmit the first reference signal within a plurality of symbol periods of the sidelink broadcast channel resource that are uniformly spaced in time.

39. The apparatus of claim 38, wherein each of the plurality of symbol periods has at least one intervening symbol period therebetween.

40. The apparatus of claim 33, wherein the instructions are further executable by the processor to cause the apparatus to:
  determine to apply the first parameter based at least on a function of a number of hops between the UE and a synchronization source for the sidelink synchronization signal.

41. The apparatus of claim 40, wherein the function is a modulo function.

42. The apparatus of claim 33, wherein the instructions are further executable by the processor to cause the apparatus to:
  determine to apply the first parameter based at least on a function of an identifier indicated in the sidelink synchronization signal.

43. The apparatus of claim 33, wherein the instructions are further executable by the processor to cause the apparatus to:
  generate a reference signal symbol based at least in part on the same reference signal sequence; and
  generate the first reference signal based at least in part on applying the first parameter to the reference signal symbol.

44. An apparatus for wireless communications by a user equipment (UE), comprising:
  a receiver,
  a processor,
  memory in electronic communication with the processor, and
  instructions stored in the memory and executable by the processor to cause the apparatus to:

receive, via the receiver, a sidelink synchronization signal;

identify a plurality of parameters that are configured for generating, from a same reference signal sequence, a plurality of reference signals for transmission within a sidelink broadcast channel resource based at least in part on receiving the sidelink synchronization signal;

receive, within the sidelink broadcast channel resource, a first reference signal of the plurality of reference signals that is generated based at least in part on applying, to the same reference signal sequence, a first parameter of the plurality of parameters that is orthogonal to a second parameter of the plurality of parameters that is applied to the same reference signal sequence to generate a second reference signal of the plurality of reference signals, the first reference signal corresponding to a first sidelink broadcast transmission and the second reference signal corresponding to a second sidelink broadcast transmission; and demodulate the sidelink broadcast channel resource based at least in part on the first reference signal to receive the first sidelink broadcast transmission via at least one same resource element as a transmission of the second sidelink broadcast transmission.

45. The apparatus of claim 44, wherein the instructions are further executable by the processor to cause the apparatus to:
monitor, within the sidelink broadcast channel resource, for the second reference signal.

46. The apparatus of claim 44, wherein the instructions are further executable by the processor to cause the apparatus to:
receive, within the sidelink broadcast channel resource, the second reference signal based at least in part on the second parameter; and
demodulate the sidelink broadcast channel resource based at least in part on the second reference signal to receive the second sidelink broadcast transmission.

47. The apparatus of claim 44, wherein the instructions to receive the sidelink synchronization signal are executable by the processor to cause the apparatus to:
receive the sidelink synchronization signal that indicates an identifier of the sidelink synchronization signal, wherein the plurality of parameters are identified based at least in part on the identifier of the sidelink synchronization signal.

48. The apparatus of claim 44, wherein the instructions to receive the sidelink synchronization signal are executable by the processor to cause the apparatus to:
receive the sidelink synchronization signal that indicates a number of hops between the UE and a synchronization source for the sidelink synchronization signal, wherein the plurality of parameters are identified based at least in part on the number of hops.

49. The apparatus of claim 44, wherein the instructions are further executable by the processor to cause the apparatus to:
monitor for the first reference signal within a plurality of subcarriers of the sidelink broadcast channel resource that are uniformly spaced in frequency.

50. The apparatus of claim 49, wherein each of the plurality of subcarriers has at least one intervening subcarrier therebetween.

51. The apparatus of claim 44, wherein the instructions are further executable by the processor to cause the apparatus to:
monitor for the first reference signal within a plurality of symbol periods of the sidelink broadcast channel resource that are uniformly spaced in time.

52. An apparatus for wireless communications by a user equipment (UE), comprising:
means for receiving a sidelink synchronization signal;
means for identifying a plurality of parameters that are configured for generating, from a same reference signal sequence, a plurality of reference signals for transmission within a sidelink broadcast channel resource based at least in part on receiving the sidelink synchronization signal;
means for transmitting, within the sidelink broadcast channel resource, a first reference signal of the plurality of reference signals that is generated based at least in part on applying, to the same reference signal sequence, a first parameter of the plurality of parameters that is orthogonal to a second parameter of the plurality of parameters that is applied to the same reference signal sequence to generate a second reference signal of the plurality of reference signals, the first reference signal corresponding to a first sidelink broadcast transmission and the second reference signal corresponding to a second sidelink broadcast transmission; and
means for transmitting, within the sidelink broadcast channel resource, the first sidelink broadcast transmission via at least one same resource element as a transmission of the second sidelink broadcast transmission.

53. An apparatus for wireless communications by a user equipment (UE), comprising:
means for receiving a sidelink synchronization signal;
means for identifying a plurality of parameters that are configured for generating, from a same reference signal sequence, a plurality of reference signals for transmission within a sidelink broadcast channel resource based at least in part on receiving the sidelink synchronization signal;
means for receiving, within the sidelink broadcast channel resource, a first reference signal of the plurality of reference signals that is generated based at least in part on applying, to the same reference signal sequence, a first parameter of the plurality of parameters that is orthogonal to a second parameter of the plurality of parameters that is applied to the same reference signal sequence to generate a second reference signal of the plurality of reference signals, the first reference signal corresponding to a first sidelink broadcast transmission and the second reference signal corresponding to a second sidelink broadcast transmission; and
means for demodulating the sidelink broadcast channel resource based at least in part on the first reference signal to receive the first sidelink broadcast transmission via at least one same resource element as a transmission of the second sidelink broadcast transmission.

* * * * *